(12) United States Patent
Park et al.

(10) Patent No.: US 10,837,934 B2
(45) Date of Patent: Nov. 17, 2020

(54) WATER DETECTION CIRCUIT, ELECTRONIC DEVICE INCLUDING THE SAME, AND WATER DETECTION METHOD

(71) Applicant: Samsung Electronics Co., Ltd., Suwon-si (KR)

(72) Inventors: Se-jong Park, Anyang-si (KR); Je-kook Kim, Yongin-si (KR); Hyeon-je Choe, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 61 days.

(21) Appl. No.: 16/353,314

(22) Filed: Mar. 14, 2019

(65) Prior Publication Data

US 2019/0302047 A1 Oct. 3, 2019

(30) Foreign Application Priority Data

Mar. 28, 2018 (KR) .................. 10-2018-0036026
Oct. 1, 2018 (KR) .................. 10-2018-0117100

(51) Int. Cl.
*G01N 27/04* (2006.01)
*G01N 27/22* (2006.01)
*H01R 13/66* (2006.01)
*H02H 5/08* (2006.01)
*H02H 1/00* (2006.01)
*G01N 27/07* (2006.01)

(52) U.S. Cl.
CPC ......... *G01N 27/223* (2013.01); *G01N 27/045* (2013.01); *G01N 27/07* (2013.01); *G01N 27/228* (2013.01); *H01R 13/6683* (2013.01); *H02H 1/0007* (2013.01); *H02H 5/083* (2013.01)

(58) Field of Classification Search
CPC .... G01N 27/223; G01N 27/045; G01N 27/07; G01N 27/228; H01R 13/6683; H02H 1/007; H02H 5/083
See application file for complete search history.

(56) References Cited

U.S. PATENT DOCUMENTS

| 6,603,319 B1 | 8/2003 | Kasahara et al. |
| 8,482,305 B2 | 7/2013 | Johnson |
| 8,539,266 B2 | 9/2013 | Kawano |
| 8,857,367 B2 | 10/2014 | Sloey et al. |

(Continued)

FOREIGN PATENT DOCUMENTS

| CN | 104204958 A | 12/2014 |
| KR | 10-2013-0136169 A | 12/2013 |
| KR | 10-2019-0005700 A | 1/2019 |

*Primary Examiner* — Robert L Deberadinis
(74) *Attorney, Agent, or Firm* — Harness, Dickey and Pierce, P.L.C.

(57) ABSTRACT

A water detection circuit includes a voltage detector electrically connected to at least one first pin of a connector and configured to detect a first voltage level from the at least one first pin at a first point in time and a second voltage level from the at least one first pin at a second point in time, a detection logic configured to compare the first voltage level with a first threshold and compare the second voltage level with a second threshold and a power controller configured to block current from being supplied to the at least first pin before the second point in time, after the first water detection operation is completed, wherein the detection logic determines that water is present in the connector when water is detected in at least one of a first water detection operation and a second water detection operation.

20 Claims, 14 Drawing Sheets

(56) References Cited

U.S. PATENT DOCUMENTS

| | | |
|---|---|---|
| 9,157,880 B2 | 10/2015 | Stevens et al. |
| 9,490,625 B2 | 11/2016 | Tanimoto et al. |
| 9,823,286 B2 | 11/2017 | Connell et al. |
| 2011/0179841 A1 | 7/2011 | Lu |
| 2012/0258126 A1 | 10/2012 | Scholler et al. |
| 2015/0037716 A1 | 2/2015 | Maruyama et al. |
| 2016/0003466 A1 | 1/2016 | Chien |
| 2016/0113822 A1 | 4/2016 | Vartiainen et al. |
| 2016/0186973 A1 | 6/2016 | Chien |
| 2016/0193322 A1 | 7/2016 | Steff et al. |
| 2017/0155214 A1 | 6/2017 | Shen et al. |
| 2017/0304213 A1 | 10/2017 | Shi et al. |
| 2017/0344508 A1 | 11/2017 | Setiawan et al. |
| 2018/0018934 A1 | 1/2018 | Lim et al. |
| 2018/0062325 A1 | 3/2018 | Kim |
| 2019/0011386 A1 | 1/2019 | Park et al. |

WATER DETECTION CIRCUIT, ELECTRONIC DEVICE INCLUDING THE SAME, AND WATER DETECTION METHOD

CROSS-REFERENCE TO RELATED APPLICATIONS

This application claims the benefits of Korean Patent Application No. 10-2018-0036026, filed on Mar. 28, 2018, and Korean Patent Application No. 10-2018-0117100, filed on Oct. 1, 2018, in the Korean Intellectual Property Office, the disclosures of each of which are incorporated herein in their entireties by reference.

BACKGROUND

Example embodiments of the inventive concepts relate to a water detection circuit. For example, at least some example embodiments relate to a water detection circuit for detecting water that has entered a connector, an electronic device including the water detection circuit, and/or a water detection method.

To prevent corrosion of connectors, there is a need to accurately recognize a foreign substance when a foreign substance has entered the connectors. For example, pins of the connectors may be corroded as current flows through the connectors in the case where a foreign substance, for example, water, has entered the connectors.

SUMMARY

Example embodiments may accurately determine a state in which water has entered the connectors and accurately determine a state in which current flows through pins of the connectors.

Example embodiments of the inventive concepts provide a water detection circuit for preventing corrosion of a connector by accurately determining a state in which water has entered the connector, an electronic device including the water detection circuit, and/or a water detection method.

According to an example embodiment of the inventive concepts, there is provided a water detection circuit including: a voltage detector electrically connected to at least one first pin of a connector including a plurality of pins, the voltage detector configured to detect a first voltage level from the at least one first pin at a first point in time and a second voltage level from the at least one first pin at a second point in time; and control circuitry configured to, compare the first voltage level with a first threshold to perform a first water detection operation, block a current from being supplied to the at least one first pin before the second point in time, after the first water detection operation is completed, compare the second voltage level with a second threshold to perform a second water detection operation, and determine whether water is present in the connector based on the first water detection operation and the second water detection operation.

According to another example embodiment of the inventive concepts, there is provided a water detection circuit including: a voltage detector electrically connected to at least one first pin of a connector including a plurality of pins, the voltage detector configured to detect a first voltage level from the at least one first pin at a first point in time and a second voltage level from the at least one first pin at a second point in time; and control circuitry configured to, determine an amount of change in a voltage detected from the first pin, based on the first voltage level detected at the first point in time and the second voltage level detected at the second point in time, determine charge or discharge characteristics of the voltage based on the amount of change in the voltage, and detect whether water is present in the connector based on the charge or discharge characteristics and a threshold.

According to another example embodiment of the inventive concepts, there is provided an electronic device including: a connector configured to connect to an external cable, the connector including a plurality of pins; a water detection circuit electrically connected to at least one first pin of the plurality of pins, the water detection circuit configured to detect whether water is present in the connector by, performing a first water detection operation based on a first voltage level and a first threshold, the first voltage level being detected from the at least one first pin at a first point in time, and performing a second water detection operation based on a second voltage level and a second threshold, the second voltage level being detected from the at least one first pin at a second point in time; and an application processor configured to control an operation of the electronic device for a subsequent process in response to the water detection circuit detecting the water being present in the connector.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Hereinafter, example embodiments of the inventive concepts will be described in detail with reference to the accompanying drawings.

A connector may have various structures. Example embodiments of the inventive concepts provide a water detection method for reducing (or, alternatively, preventing) corrosion of connectors of various structures by accurately determining a state in which a foreign substance such as water has entered the connectors.

In the following example embodiments, a Universal Serial Bus (USB) Type-C or Universal Serial Bus Power Delivery (USB PD) Type-C connector structure will be described as a structure of a connector. However, the example embodiments of the inventive concepts may be equally or similarly applied to connectors of various other structures. For example, the example embodiments of the inventive concepts may also be applied to other types of USB connector structures. In the following example embodiments, a case where water as an example of the foreign substance enters a connector will be described. However, the example embodiments of the inventive concepts may be applied to other various kinds of foreign substances that may enter the connector. Accordingly, a water detection circuit and the water detection method according to the example embodiments of the inventive concepts may be referred to as a foreign substance detection circuit and a foreign substance detection method.

When water is recognized, a system may determine the water as resistance. The system may use an area that does not affect a Type-C operation in the connector, to determine whether resistance is generated when there is water in the connector. When there is no water in the connector, an infinite resistance is seen in a floating state, and in a state in which water has entered the connector, a small resistance value is seen instead of an infinite resistance. There are many ways to monitor the resistance and the ways may be selectively used.

In describing the following example embodiments, the term "connector" may be replaced by a receptacle. Furthermore, the term "pin" included in the connector may be replaced with a terminal.

Figure 1:
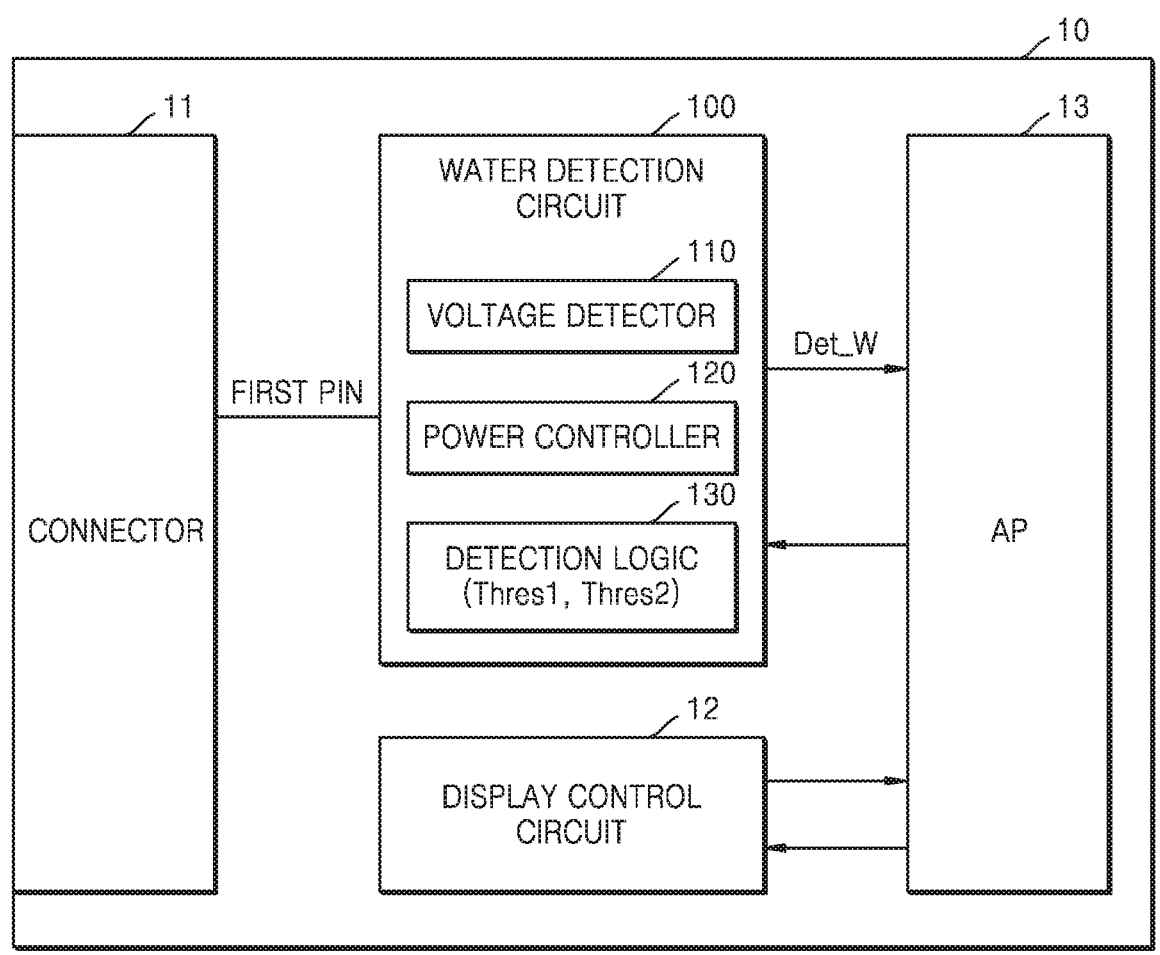
FIG. 1 is a block diagram of an electronic device including a water detection circuit according to an example embodiment of the inventive concepts.

FIG. 1 is a block diagram of an electronic device 10 including a water detection circuit according to an example embodiment of the inventive concepts.

Referring to FIG. 1, the electronic device 10 may include a connector 11 connected to an external cable to perform communication between an external device and the electronic device 10, and a water detection circuit 100 connected to at least one pin included in the connector 11. In addition, the electronic device 10 may include a processor for controlling overall operations of the electronic device 10. For example, the electronic device 10 may include an application processor (AP) 13. In addition, the electronic device 10 may further include a display control circuit 12.

According to various example embodiments of the inventive concepts, the electronic device 10 may include, for example, at least one of smart phones, tablet personal computers (PCs), mobile phones, image telephones, e-book readers, desktop PCs, laptop PCs, netbook computers, workstations, servers, personal digital assistants (PDAs), portable multimedia players (PMPs), MP3 players, mobile medical devices, cameras, and wearable devices. According to various example embodiments, the wearable devices may include at least one of accessory-type devices (for example, watches, rings, bracelets, anklets, necklaces, glasses, contact lenses, or head-mounted devices (HMDs), fabrics or clothes-integrated devices (for example, electronic clothes), body-attached devices (for example, skin pads or tattoos), and living body-implanted devices (for example, implantable circuits).

According to an example embodiment, the water detection circuit 100 may be implemented with an integrated circuit (IC), or in an IC performing various functions. According to an example embodiment, as the water detection circuit 100 is implemented with an IC, the water detection circuit 100 may further include a processor for controlling overall operations of the IC based on hardware and/or software. The connector 11 may include a plurality of pins defined in a specification, and the water detection circuit 100 may include a circuit capable of detecting a resistance or voltage from one or more pins in the connector 11. That is, when water enters the connector 11 (or when there is a foreign substance in the connector 11), the value of a resistance detected from the one or more pins may be changed due to the water, and the water detection circuit 100 may detect or determine the presence or absence of water in the connector 11 by detecting the changed resistance.

According to an example embodiment, the electronic device 10 may use an area that does not affect a USB Type-C operation in the connector 11, to determine whether resistance variation of the pins due to water inflow occurs. When there is no water in the connector, an infinite resistance is detected from a corresponding pin in a floating state, whereas in a state in which there is water in the connector, a small resistance value (e.g., a few kiloohms to several megaohms) rather than an infinite resistance may be detected. There are various methods of monitoring the resistance, and the electronic device 10 may detect the variation of the resistance by selectively using various resistance monitoring methods.

Hereinafter, a water detection operation according to an example embodiment of the inventive concepts will be described.

Referring to FIG. 1, the water detection circuit 100 may be connected to at least one pin (e.g., a first pin) of a connector 11 and may output a detection result Det_W obtained by detecting whether there is water in the connector. The water detection circuit 100 may include a voltage detector 110, a power controller 120, and a detection logic 130. As an example, the water detection circuit 100 may be electrically connected to the first pin, and the voltage detector 110 may detect the resistance of the first pin based on a voltage (or voltage level) detected from the first pin. As an example, in order for the voltage detector 110 to output a digital signal corresponding to the detected voltage, the voltage detector 110 may include an analog-to-digital converter (ADC) (not shown). That is, the voltage detector 110 may detect voltages at different levels according to the resistance of the first pin and may output a digital code corresponding to a detected voltage to generate a resistance detection result.

The detection logic 130 may generate the detection result Det_W using the output from the voltage detector 110. As an example, the voltage detector 110 may output a digital code according to a detected voltage, and the detection logic 130 may generate a detection result Det_W indicating that water is detected or not detected, based on the value of the digital code. If water is detected, a smaller voltage as compared with the case where no water is detected may be detected from the first pin, and the detection logic 130 may generate a detection result Det_W indicating that water has been detected when the value of the digital code is less (or, equal to or greater) than a reference value.

The power controller 120 may perform a power control operation for the water detection operation. As an example, a current having a certain level may be applied to the first pin in order to detect water, and the power controller 120 may adjust the level of the current applied to the first pin, or perform a control operation so that the current is applied or not applied to the first pin.

When the resistance of the first pin decreases as water enters the connector 11, a voltage having a smaller value than when no water is present may be detected in the connector 11 when the current is applied to the first pin. Depending on the type of water, the resistance due to the water may vary. For example, if water such as fresh water having a relatively high resistance flows into the connector 11, it may be erroneously determined that water has not entered the connector.

According to an example embodiment of the inventive concepts, to improve the accuracy of water detection, the power controller 120 may control the current applied to the first pin and the detection logic 130 may perform a detection operation by using at least two thresholds Thres 1 and Thres 2. As an example, the first threshold Thres 1 may be greater than the second threshold Thres 2, and the detection logic 130 may compare a voltage detected from the first pin with the first threshold Thres 1 and perform a detection operation based on a result of the comparison. If it is determined that water does not flow into the connector 11 as the detected voltage is greater than the first threshold Thres 1, the detection logic 130 performs another detection operation using the second threshold Thres 2.

As an example, during the another detection operation, the supply of current to the first pin may be blocked based on a control operation of the power controller 120, and a detection operation may be performed by comparing a voltage detected from the first pin after a certain time with the second threshold Thres 2. A detection result Det_W may be finally generated depending on a result of the detection operation.

When water flows into the connector 11, the water may temporarily have a capacitance component in addition to a basic resistance component. Accordingly, when current is applied to the first pin, the water itself may store a corresponding energy as an electric potential energy, and the resistance component of the water to be measured may not be accurately detected due to such a phenomenon. That is, according to the water that has actually entered the connector 11, a voltage level detected from the first pin has to be less than the first threshold Thres 1, but the voltage level detected from the first pin may be greater than the first threshold Thres 1 due to the capacitance component and thus it may be erroneously determined that there is no water in the connector 11.

On the other hand, according to an example embodiment of the inventive concepts, the application of current to the first pin may be blocked after the water detection operation using the first threshold Thres 1, and a voltage may be detected from the first pin again after a certain time. In this case, when there is no water in the connector 11, the first pin may be in an open state, and accordingly, a voltage level detected from the first pin may be less than the second threshold Thres 2. On the other hand, when there is water in the connector 11, there may be a potential due to a capacitance component even if no current is applied to the first pin, and accordingly, the voltage level detected from the first pin may be greater than the second threshold Thres 2. As a result, according to an example embodiment of the inventive concept, it is possible to accurately detect whether there is water in the connector 11 or not.

If it is determined that water has entered the connector 11, the electronic device 10 may perform an internal control operation for a corresponding additional process. According to an example embodiment, the AP 13 may control the display control circuit 12 based on the detection result Det_W to perform a control operation so that a warning screen indicating whether water has entered the connector 11 is output. In addition, the electronic device 10 may further include a power generator (not shown) that provides power to various components therein, and may prevent power from being provided to the various components when water flows into the connector 11.

Figure 2:
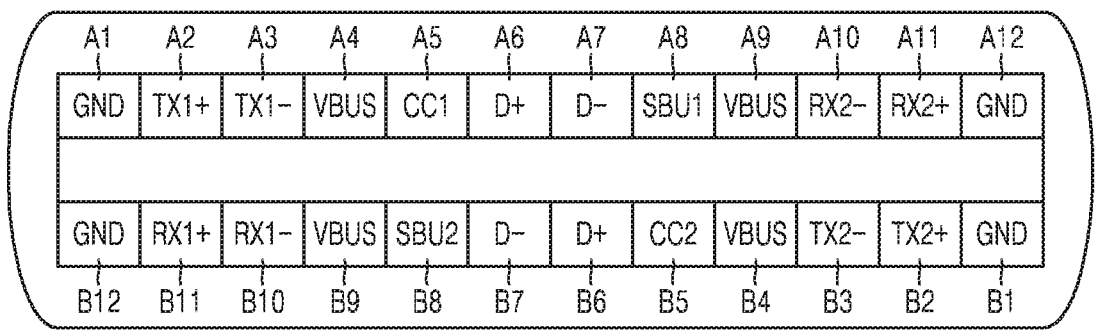
FIG. 2 is a diagram illustrating an example in which a connector is applied to a connector of a Universal Serial Bus (USB) Type-C structure, according to an example embodiment of the inventive concepts.

FIG. 2 is a diagram illustrating an example in which a connector is applied to a connector of a USB Type-C structure, according to an example embodiment of the inventive concepts. Various terms shown in FIG. 2 may be easily understood by those skilled in the art through USB specifications, and thus, detailed descriptions thereof will be omitted.

Referring to FIG. 2, a plurality of pins included in the connector of the USB Type-C structure may have a symmetrical structure. That is, the symmetrical structure enables connection between a cable or a gender and a USB Type-C connector of an electronic device regardless of the directionality of the cable. As an example, the cable may be connected to the connector without having to match the cable to pin directionality of the connector.

The connector of the USB Type-C structure may include pins of two columns. As an example, the connector of the USB Type-C structure may include pins A1 to A12 in a first row and pins B1-B12 in the second row. As an example, the connector of the USB Type-C structure may support data communication at various speeds. As an example, the connector of the USB Type-C structure may include pins A2, A3, A10, A11, B2, B3, B10, and B11 for supporting high-speed data communication according to a first standard (e.g., USB 3.1) and pins A6, A7, B6, and B7 for supporting low-speed data communication according to a second standard (e.g., USB 2.0). In addition, each of the pins A1 to A12 in the first row and the pins B1 to B12 in the second row may perform its own function. For example, the pins A4, A9, B4 and B9 (hereinafter, referred to as VBUS pins) may correspond to power supply pins, the pins A1, A12, B1 and B12 (hereinafter, referred to as GND pins) may correspond to pins for transmitting a ground voltage, and the pins A8 and B8 (hereinafter, referred to as Sideband Use (SBU) pins) may be used to support an Alternate (ALT) mode and may be connected to a cable with Thunderbolt, DisplayPort, HDMI, or the like mounted thereon.

An apparatus employing the connector of the USB Type-C structure may perform bidirectional communication.

As an example, the above-described electronic device may operate as a host (e.g., a downstream facing port (DFP)) or a slave (e.g., an upstream facing port (UFP)) when connected to an external device via a USB interface. Alternatively, the above-described electronic device may operate as a dual role port (DRP), and in this case, the electronic device may adaptively change the role of the host (e.g., DFP) or the slave (e.g., UFP).

The role of the electronic device may be specified through the pins A5 and B5 (hereinafter, referred to as configuration channel pins (a CC1 pin and a CC2 pin)) of the connector of the USB Type-C structure. As an example, in the case of the USB interface, data connection and control may be performed by digital communication via the CC1 pin A5 and the CC2 pin B5.

Depending on the model of the electronic device, only some of the plurality of pins provided in the connector may be used. For example, some models may not use one or more of the GND pins A1, A12, B1, and B12. Alternatively, some models may not use at least one of the pins A2, A3, A10, A11, B2, B3, B10, and B11 related to high-speed data communication. A pin not used in the electronic device may not be electrically connected to an integrated circuit (IC) in the electronic device associated with communication. According to an example embodiment of the inventive concepts, at least one of the plurality of pins shown in FIG. 2 may be used as the first pin described above. For example, at least one of unused pins may be set as the first pin in the example embodiment described above, and a water detection circuit may be connected to the first pin. Alternatively, a water detection period may be set before a cable is connected to the connector and the first pin performs its function, and a water detection circuit according to the example embodiment described above may be provided in an IC to be connected to the first pin and water may be detected in the water detection period through the first pin.

Figure 3:
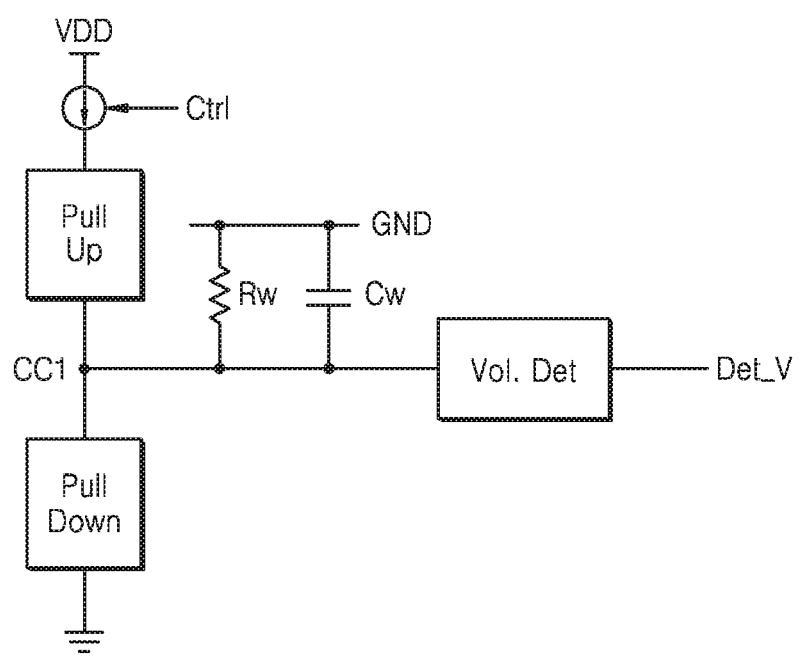
FIG. 3 is a circuit diagram illustrating an example of an equivalent circuit when water enters the connector in a state in which a configuration channel 1 (CC1) pin is set as a first pin.

FIG. 3 is a circuit diagram illustrating an example of an equivalent circuit when water flows into the connector in a state in which the CC1 pin is set as the first pin.

Referring to FIG. 3, as water flows into the connector, the CC1 pin may be electrically connected to the ground voltage of the connector through the water. As an example, the connector may include a plurality of GND pins as described above, and the connector may also include a conductive line (not shown) for transmitting the ground voltage. As water flows into the connector, the CC1 pin may be electrically connected to at least one of the GND pins or the conductive line through the water.

In a system employing a connector of the USB Type-C structure, the CC1 pin may be connected to a power supply voltage VDD through a pull-up circuit and may also be connected to a ground voltage through a pull-down circuit. As an example, each of the pull-up and pull-down circuits may include one or more resistors and switches, and a connection state of the CC1 pin may be controlled based on the control of an IC connected to the CC1 pin. In addition, the IC connected to the CC1 pin may include a current source to provide current to the CC1 pin through the pull-up circuit, and a voltage applied to the CC1 pin can be detected by the current.

As water flows into the connector, the CC1 pin may be electrically connected to the ground voltage (e.g., a GND pin), a resistance Rw may be formed between the CC1 pin and the GND pin due to the water, and a capacitance component Cw that stores an electrical potential energy in the water itself may be formed. A voltage level detected from the CC1 pin and a variation of the voltage level may be influenced by the resistance Rw and the capacitance component Cw, and a voltage detector provided in the IC may output a voltage detection result Det_V obtained by detecting a voltage applied to the CC1 pin. In an example embodiment, the voltage detector may include a comparator that compares a voltage detected from the CC1 pin with a reference voltage, and may provide a result, obtained by comparing the voltage detected from the CC1 pin with the reference voltage, as the voltage detection result Det_V. The voltage detection result Det_V from the voltage detector may be provided to the detection logic in the example embodiment described above.

According to the example embodiment described above, in performing water detection, the current source may control a current output operation in response to a control signal Ctrl. For example, the control signal Ctrl may be generated by the power controller 120 in the embodiment of FIG. 1, and when no water is detected in a detection operation using the first threshold Thres 1, the current source may block the current output operation in response to the signal Ctrl and a detection operation using the second threshold Thres 2 may be performed again after a certain time after the current output operation is blocked.

Figure 4:
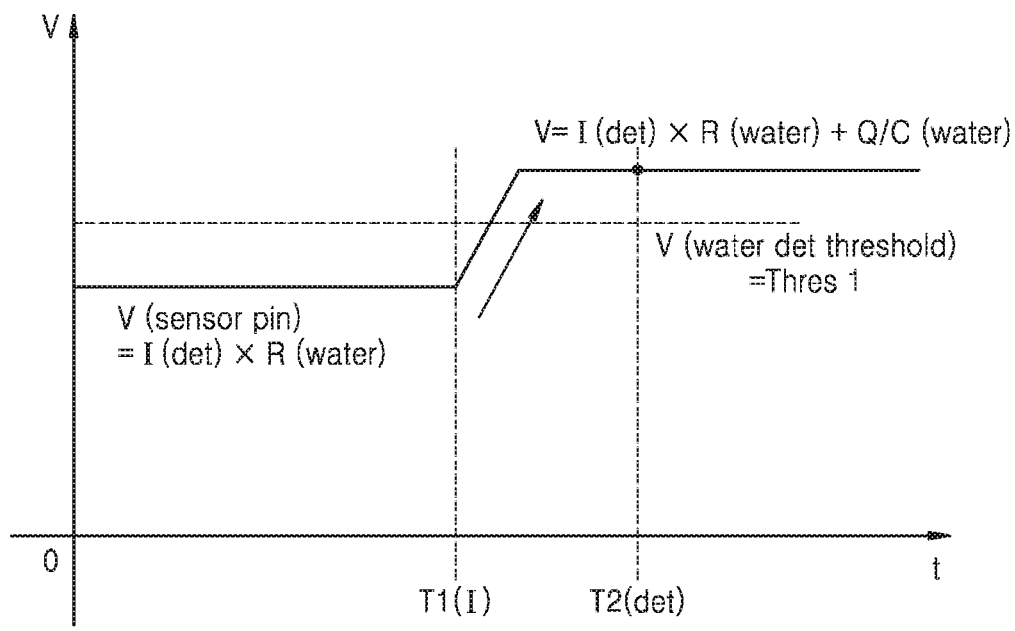
FIGS. 4, 5A, and 5B are waveform diagrams illustrating a water detection operation according to an example embodiment of the inventive concepts.
Figure 5A:
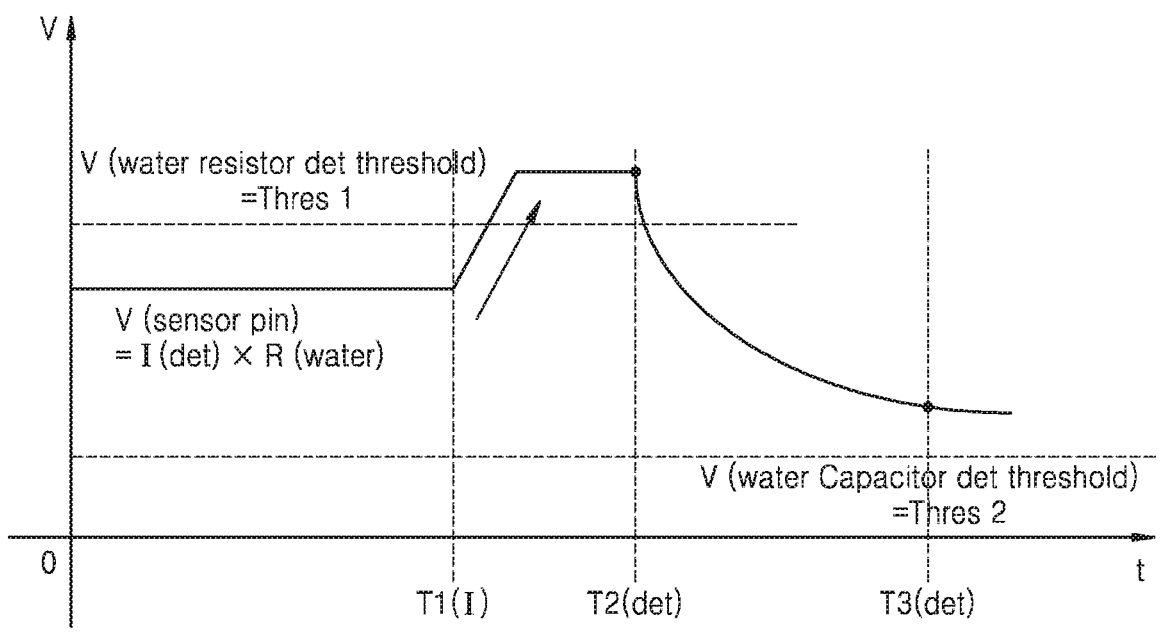
Figure 5B:
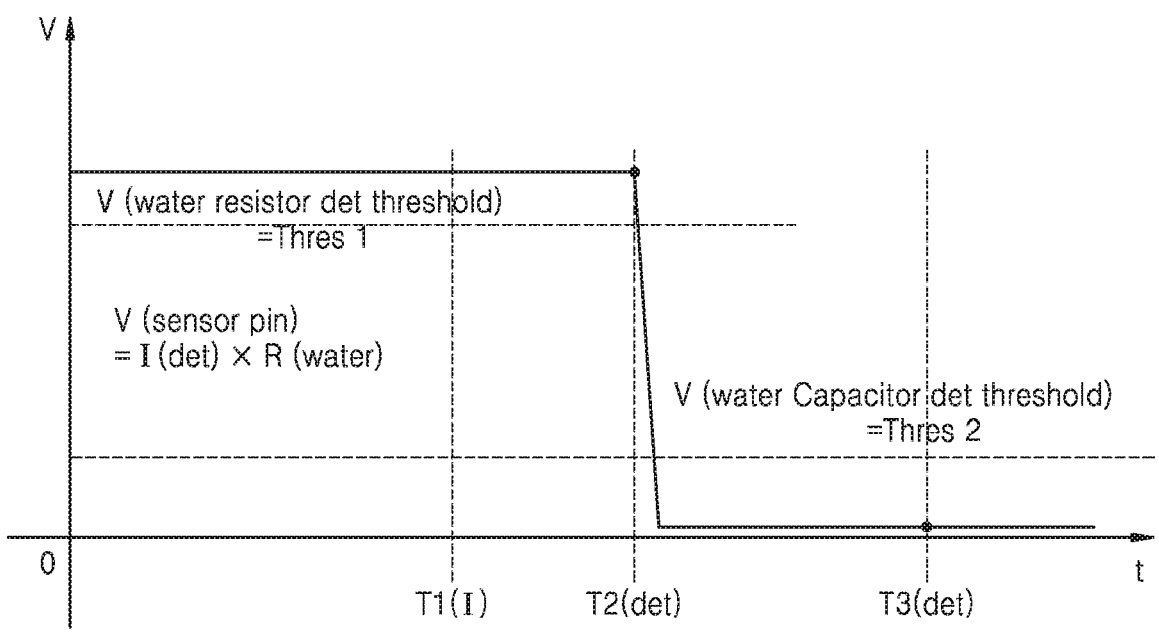

FIGS. 4, 5A, and 5B are waveform diagrams illustrating a water detection operation according to an example embodiment of the inventive concept. FIG. 4 illustrates characteristics of a voltage level applied to the first pin when current is applied to the first pin for water detection, and FIGS. 5A and 5B illustrates an example of the water detection operation according to an example embodiment of the inventive concept.

Referring to FIG. 4, a current I (det) from a current source may be applied to the first pin for water detection and a voltage level detected through the first pin may have a constant value by the current I (det) and a resistance component due to water. In addition, electric charges may be generated in the water itself after the application of the current I (det), and accordingly, the voltage level may rise at time T1. Thus, a voltage level detected from the first pin at time T2 that is a point in time at which water detection is performed may be greater than the first threshold Thres 1 corresponding to a reference level of the water detection, and accordingly, it may be erroneously detected that there is no water even though there is water in the connector. In the waveform diagram shown in FIG. 4, R (water) represents a resistance due to water and Q/C (water) represents a level of increase in voltage due to a capacitance component of the water.

Generally, since water similar to fresh water such as tap water has a high resistance itself, a voltage may be formed near a first threshold Thres 1, which is a range recognized as water when a current is applied, and there is a high possibility that the accuracy of the detection of the water similar to fresh water is lowered as compared to the detection of entry of water containing electrolytes, for example, salt water.

On the other hand, referring to FIG. 5A, a voltage may increase by a capacitance component in water, and when a voltage level detected from the first pin at the time T2 is greater than the first threshold Thres 1, the presence or absence of water may be detected again. As an operation example, the application of current to the first pin may be blocked as water is not detected at the time T2, and a voltage may be detected from the first pin at time T3 after a certain time. Even if current is not applied to the first pin, a voltage may be detected from the first pin due to a capacitance component of water. When a voltage from the first pin at the time T3 is greater than a second threshold Thres 2, the presence of water in a connector may be detected.

FIG. 5B illustrates a case where no water is detected at the time T2 as there is no water in a connector.

As water is not detected at the time T2, the application of current to the first pin is blocked, and an operation of detecting a voltage from the first pin at the time T3 is performed. In this case, when there is no water in the connector, no voltage is detected from the first pin or a voltage, which is less than the second threshold Thres 2, is detected because there is no capacitance component of water. In this case, it may be finally detected that water is absent from the connector.

According to an example embodiment, the second threshold Thres 2, which is set for re-detecting the presence or absence of water, may be set at various levels. As an example, the second threshold Thres 2 may be set considering a degree of reduction of a voltage level detected from the first pin as the application of current to the first pin is blocked, and an electrical potential energy that may be stored by various kinds of water.

Figure 6:
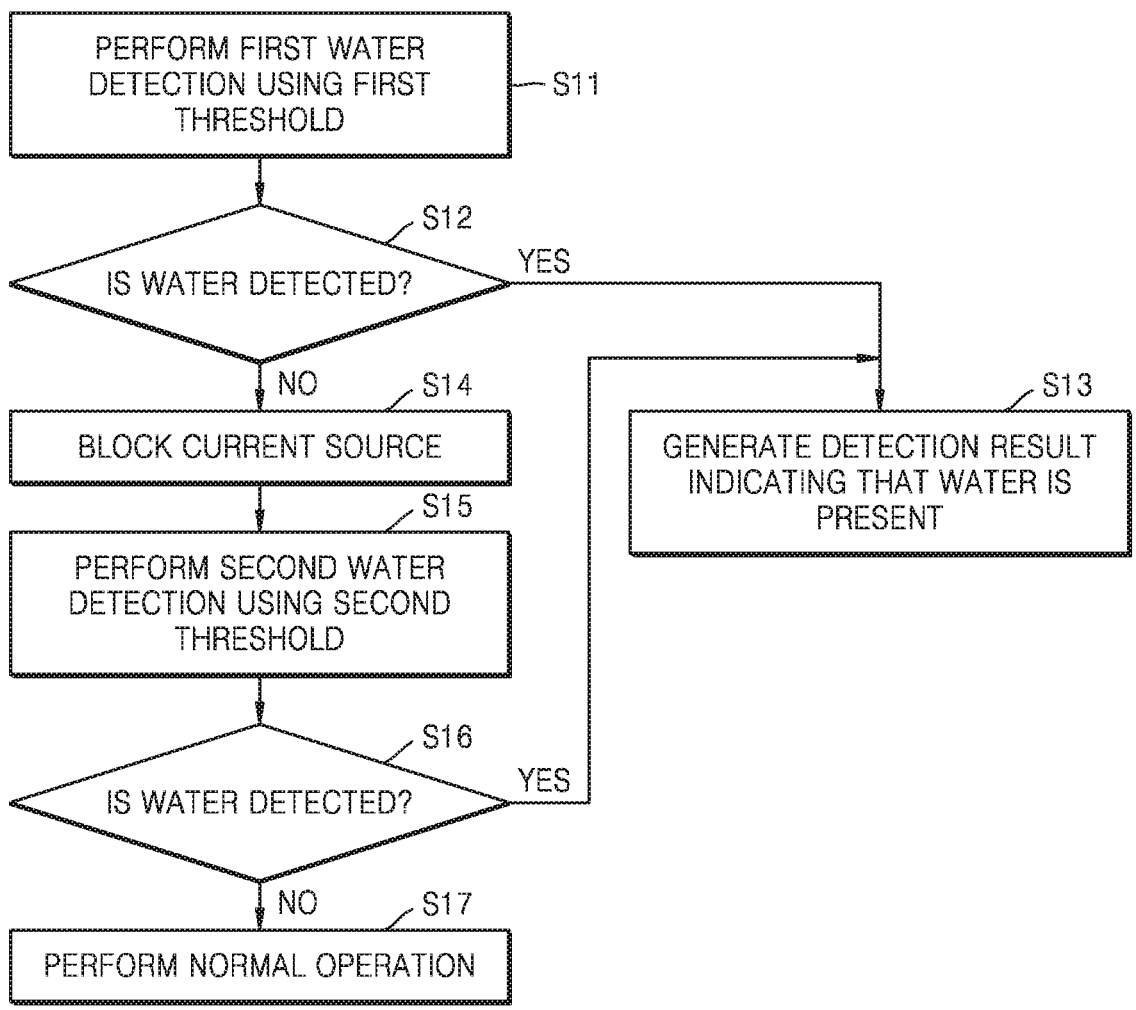
FIG. 6 is a flowchart of a water detection method according to an example embodiment of the inventive concepts.

FIG. 6 is a flowchart of a water detection method according to an example embodiment of the inventive concepts. In the example embodiment shown in FIG. 6, a first pin used for water detection may be selected from a plurality of pins provided in a connector, and when the first pin corresponds to a CC1 pin or a CC2 pin, a circuit connected to the first pin to control a water detection operation may be a Configuration Channel Integrated Circuit (CCIC).

Referring to FIG. 6, in operation S11, a voltage level (i.e., a first voltage level) may be detected from the first pin, and a first water detection operation may be performed using the detected first voltage level and a first threshold.

In operation S12, the presence or absence of water may be detected in the first water detection operation. As an example, when the detected first voltage level is lower than the first threshold, it may be detected that there is water in the connector. When water is detected, in operation S13, a detection result indicating that there is water in the connector may be generated as the water is detected.

On the other hand, when it is detected that there is no water in the connector as the first voltage level is greater than the first threshold in the first water detection operation, in operation S14, a current source may be controlled such that the current application to the first pin is blocked. Thereafter, in operation S15, a second water detection operation using a second threshold may be performed after a certain time after the current application to the first pin is blocked. For example, a voltage level (i.e., a second voltage level) may be detected from the first pin in a state in which the current application to the first pin is blocked, and the detected second voltage level may be compared to a second threshold.

In operation S16, whether there is water in the connector or not may be determined according to a result of comparing the second voltage level with the second threshold. As an example, when there is water in the connector, an electrical potential energy may be stored due to a capacitance component of the water, and thus the second voltage level detected from the first pin may be greater than the second threshold by the electrical potential energy applied to the first pin.

When water is detected during the second water detection operation, in operation S13, a detection result indicating that there is water in the connector may be generated. On the other hand, when water is not detected in both the first water detection operation and the second water detection operation, in operation S17, an electronic device including the connector may perform a normal operation.

Figure 7:
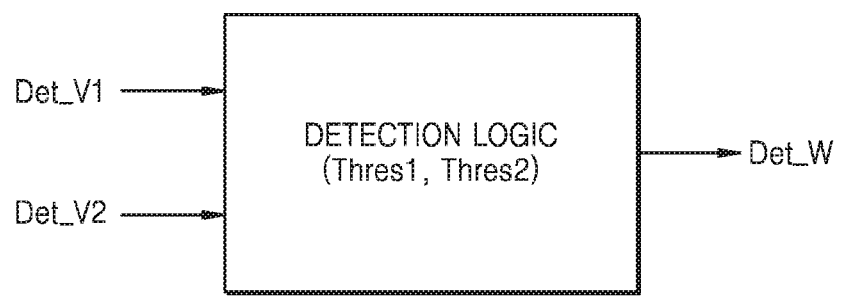
FIG. 7 is a block diagram of a water detection circuit according to a modifiable example embodiment of the inventive concepts.

FIG. 7 is a block diagram of a water detection circuit according to an example embodiment of the inventive concepts. In FIG. 7, a detection logic, which receives a first voltage level Det_V1 detected from the first pin at a first point in time and a second voltage level Det_V2 detected from the first pin at a second point in time via a voltage detector (not shown) in the water detection circuit, is illustrated. According to the example embodiment described above, the voltage detector may provide a detection result having a digital value according to a voltage level, and as in the example embodiment described above, the detection logic may perform a water detection operation by using a first threshold Thres 1 and a second threshold Thres 2.

According to example embodiments, a method of finally determining that there is water in a connector may be variously set. As an example, when water is detected in either a first water detection operation using the first threshold Thres 1 or a second water detection operation using the second threshold Thres 2, the detection logic may finally determine that there is water in a connector. For example, it may be determined that there is water in the connector when the first voltage level Det_V1 is less than the first threshold Thres 1 in the first water detection operation, or it may be determined that there is water in the connector when the second voltage level Det_V2 is greater than the second threshold Thres 2 in the second water detection operation According to a modifiable example embodiment, the detection logic may finally determine that there is water in the connector when water is detected in both the first water detection operation and the second water detection operation. For example, even if it is detected that there is water in the connector in the first water detection operation, it may be finally determined that there is no water in the connector through the second water detection operation.

According to an example embodiment, the second water detection operation may be selectively performed based on a detection result of the first water detection operation, and as an example, when water is not detected in the first water detection operation, the second water detection operation may be selectively performed. For example, as a detection result Det_W indicating that water is not detected through the first water detection operation is generated from the detection logic, the water detection circuit may perform an internal control operation such that the second water detection operation is performed.

As a modifiable example embodiment, the second water detection operation may be performed regardless of the detection result of the first water detection operation, and the detection logic may combine detection results of the first and second water detection operations to finally determine the presence or absence of water.

Figure 8:
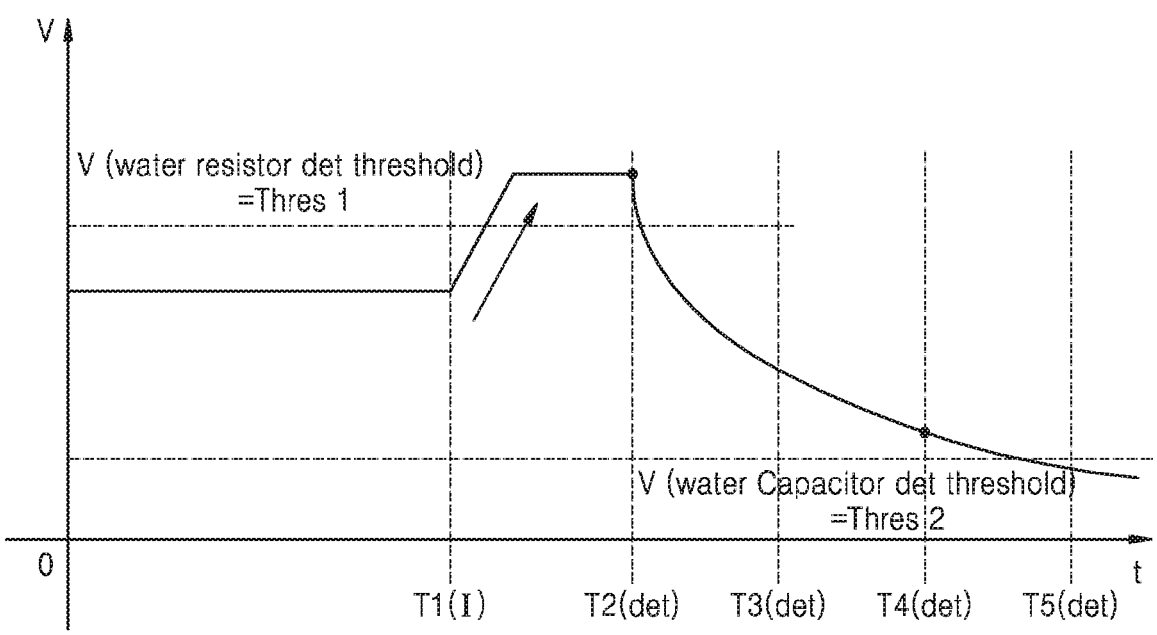
FIG. 8 is a waveform diagram illustrating a case where a water detection operation is performed a plurality of times in a state in which current application to a first pin is blocked.

FIG. 8 is a waveform diagram illustrating a case where a water detection operation is performed a plurality of times in a state in which the current application to the first pin is blocked.

Referring to FIG. 8, a current I (det) from a current source may be applied to the first pin in order to detect water, and a voltage level applied to the first pin may rise at time T1 according to electric charges generated in the water itself after the current application. In addition, a first water detection operation using a first threshold Thres 1 may be performed at time T2, the application of current to the first pin may be blocked as water is not detected, and a second water detection operation may be performed at time T3 after a certain time. In addition, a third water detection operation may be performed at time T4 after a certain time from the time T3. Although FIG. 8 shows an example in which the water detection operation is performed twice after the application of current to the first pin is blocked, example embodiments of the inventive concepts are not limited thereto.

The detection logic in the example embodiment described above may finally determine whether there is water in a connector, based on detection results of a plurality of water detection operations after the application of the current is blocked. As an example, when water is detected in at least one of the second water detection operation and the third water detection operation, it may be finally detected that there is water in the connector. Alternatively, when water is detected in both the second water detection operation and the third water detection operation, it may be detected that there is water in the connector.

According to an example embodiment, an additional water detection operation may be performed at time T5 after a potential due to water itself is lowered. A voltage level detected through the first pin at the time T5 may be less than a second threshold Thres 2. In this case, it may be determined that a voltage detected through the first pin has changed over time from a level greater than the second threshold Thres 2 to a level lower than the second threshold Thres 2, due to a potential of water itself as there is water in the connector, and it may be finally determined that there is water in the connector as a voltage level lower than the second threshold Thres 2 is detected from the first pin at the time T5.

The example embodiment of FIG. 8 shows an example in which a plurality of water detection operations after the application of current is blocked use the second threshold Thres 2. However, example embodiments of the inventive concepts are not limited thereto. As an example, thresholds used in the plurality of water detection operations may be set to be different from one another. In addition, the thresholds used in the plurality of water detection operations may be set to be different from one another in consideration of reduction characteristics of a potential due to water itself.

Figure 9:
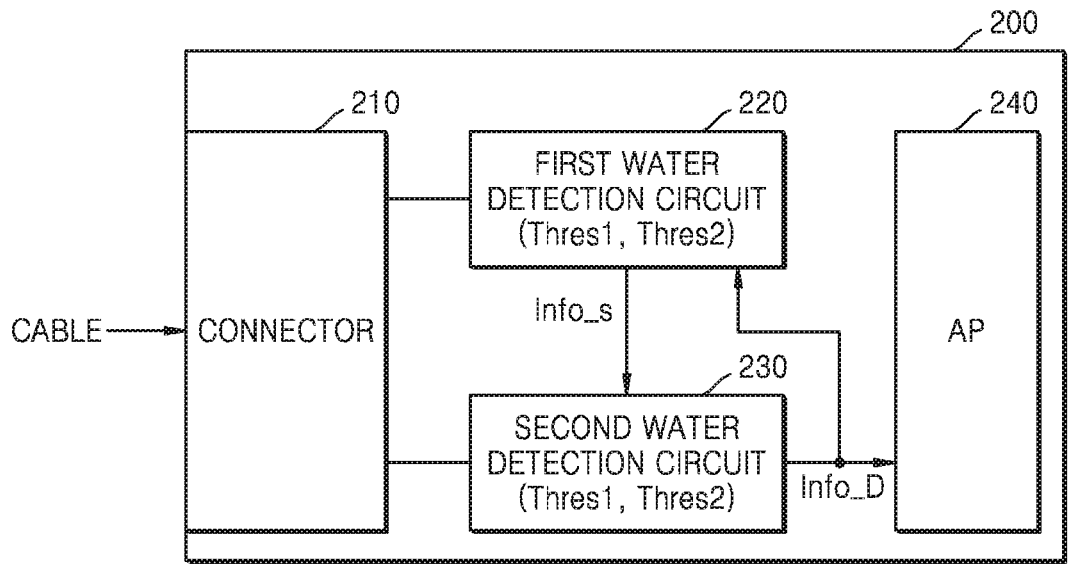
FIGS. 9 and 10 are block diagrams of electronic devices according to example embodiments of the inventive concepts.
Figure 10:
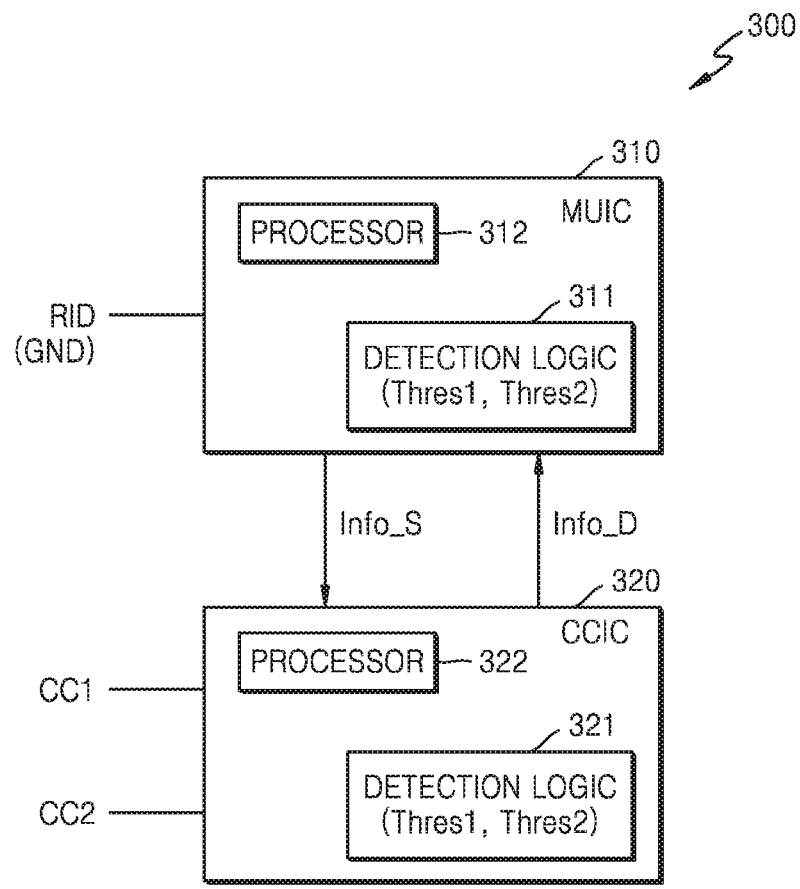

FIGS. 9 and 10 are block diagrams of electronic devices 200 and 300 according to example embodiments of the inventive concepts. An example in which water is finally recognized according to a result of water detection for at least two pins is described with reference to FIGS. 9 and 10.

Referring to FIG. 9, the electronic device 200 may include a connector 210 connected to a cable external to the electronic device 200 and performing communication between the electronic device 200 and a device external thereto, and may also include a first water detection circuit 220 and a second water detection circuit 230, which are respectively connected to pins included in the connector 210. In addition, the electronic device 200 may further include a processor controlling overall operations therein, for example, an AP 240.

Each of the first water detection circuit 220 and the second water detection circuit 230 may include a detection logic (not shown) according to the example embodiments described above. In addition, each of the first water detection circuit 220 and the second water detection circuit 230 may be implemented with an IC. For example, each of the first water detection circuit 220 and the second water detection circuit 230 may include a circuit capable of detecting resistance or a voltage from a pin included in the connector 210. That is, when water flows into the pin included in the connector 210 (or when there is water in the connector 210), a voltage level detected from the pin may be changed, and each of the first water detection circuit 220 and the second water detection circuit 230 may detect whether there is water, by detecting the changed voltage level.

According to an example embodiment, the first water detection circuit 220 may be electrically connected to at least one pin (e.g., a first pin) of the connector 210, and may detect water by detecting a voltage level from the first pin. As an example, the first water detection circuit 220 may provide a first detection result Info_s according to a water detection result to the second water detection circuit 230.

In an example embodiment of the inventive concepts, the final determination of the presence of water may be performed by combining detection results of the first water detection circuit 220 and the second water detection circuit 230. As an example, the first detection result Info_s from the first water detection circuit 220 may be provided to the second water detection circuit 230, and when the first detection result Info_s corresponds to a result indicating that there is water in the connector 210, the second water detection circuit 230 may perform a water detection operation.

According to an example embodiment, the first pin among a plurality of pins included in the connector 210 may be a pin used exclusively for the water detection operation. That is, the first pin may be a pin not related to communication between the electronic device 200 and a device external thereto, and the first water detection circuit 220 may not perform operations related to communication except for the water detection operation. That is, the first pin may not be electrically connected to other integrated circuits related to communication, in the electronic device 200.

As an example of an operation, the second water detection circuit 230 may be electrically connected to at least one pin (e.g., a second pin) different from the first pin of the connector 210, and may detect the presence or absence of water by detecting a voltage from the second pin. As an example, the second pin may be a pin related to communication with the external device, and the second water detection circuit 230 may perform an operation related to communication with the external device by using the second pin, in a normal mode. That is, the second water detection circuit 230 may be operated in the normal mode, a low power mode, or a water detection mode according to the first detection result Info_s.

The second water detection circuit 230 may detect a voltage level from the second pin, and may generate a second detection result Info_D based thereon. If the second water detection circuit 230 also detects that there is water in the connector 210, the second detection result Info_D may correspond to a final recognition result obtained by recognizing that there is water in the connector 210. The detection result Det_W provided to the AP 13 in FIG. 1 may correspond to the second detection result Info_D output from the second water detection circuit 230. Alternatively, the second detection result Info_D from the second water detection circuit 230 may be provided to the first water detection circuit 220 and the first water detection circuit 220 may output the detection result Det_W.

According to an example embodiment, when the second detection result Info_D corresponds to the detection result Det_W, the detection result Det_W may be provided to the AP 240, and the AP 240 may perform various control operations for reducing (or, alternatively, preventing) corrosion of the connector 210 and may also perform various control operations for notifying the inflow of water to a user of the electronic device 200. As an example, the AP 240 may prevent a current from flowing through the connector 210 by controlling a power management IC (not shown), and may block an operation such as a charging operation or the like, which uses the connector 210, from being performed.

As described above, according to an example embodiment of the inventive concepts, when water is detected through the first and second water detection circuits 220 and 230, it may be finally recognized that there is water in the connector 210. That is, although water recognition may be incorrectly performed due to various factors such as physical damage to the connector 210, according to an example embodiment of the inventive concepts, since water recognition is performed based on a combination of different detection operations, the accuracy of recognition may be improved.

The example embodiment of the inventive concepts described above may be applied to at least one of the first water detection circuit 220 and the second water detection circuit 230. For example, when water is not detected from a first pin through a detection operation using a first threshold Thres 1, the first water detection circuit 220 may block a current from being applied to the first pin, and a water detection operation using a second threshold Thres 2 may be performed after a certain time. That is, when there is water in the connector 210, a voltage due to a capacitance component may be detected, and thus, water may be detected through a comparison operation using the second threshold Thres 2.

In a same or similar manner, the second water detection circuit 230 may improve the accuracy of water detection through a water detection operation using the first threshold Thres 1 and the second threshold Thres 2.

Referring to FIG. 10, the electronic device 300 may include a first water detection circuit 310 and a second water detection circuit 320, and a first pin connected to the first water detection circuit 310 may be a ground (GND) pin defined in the USB Type-C and a second pin connected to the second water detection circuit 320 may be a CC1 and/or CC2 pin defined in the USB Type-C. Also, the first water detection circuit 310 may be a micro USB IC (MUIC) or a configuration included therein, and the second water detection circuit 320 may be a configuration channel IC (CCIC) or a configuration included therein. The first water detection circuit 310 (i.e., MUIC), may include a detection logic 311 and a processor 312. The detection logic 311 may perform a water detection operation using first and second thresholds Thres 1 and Thres 2 according to the example embodiments described above, and the processor 312 may control overall operations in the first water detection circuit 310 (i.e., MUIC). The second water detection circuit 320 (i.e., CCIC) may also include a detection logic 321 and a processor 322 and may perform a water detection operation using the first and second thresholds Thres 1 and Thres 2 according to the example embodiments described above.

According to the example embodiments described above, the first water detection circuit 310 (i.e., MUIC) may provide a first detection result Info_s as a water detection result to the second water detection circuit 320 (i.e., CCIC), and the second water detection circuit 320 (i.e., CCIC) may provide a second detection result Info_D as a water detection result to the first water detection circuit 310 (i.e., MUIC).

Figure 11:
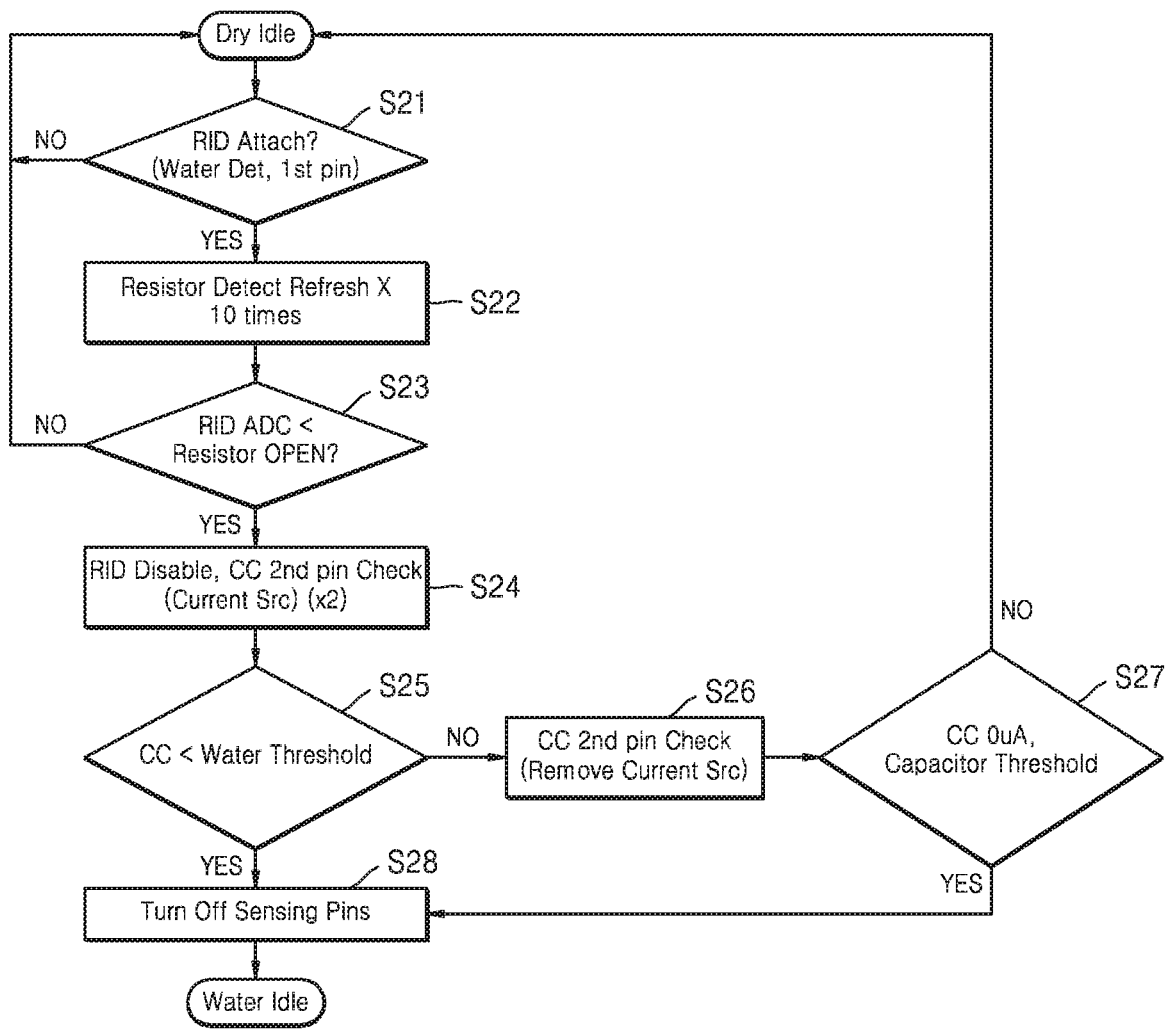
FIG. 11 is a flowchart of a method of operating a water detection circuit, according to an example embodiment of the inventive concepts.

FIG. 11 is a flowchart of a method of operating a water detection circuit, according to an example embodiment of the inventive concepts.

Referring to FIG. 11, in operation S21, it may be determined whether a variation of a resistance RID of a connector (or a first pin of the connector) has occurred in a dry state. The variation of the resistance RID may be due to various factors. For example, the variation of the resistance RID may occur when a cable is normally connected to the connector or when water flows into the connector.

When it is determined that the variation of the resistance RID has occurred, in operation S22, the detection of a resistance variation may be performed a plurality of times (e.g., 10 times) to discriminate whether the variation of the resistance RID corresponds to a one-time noise generated when the cable is inserted into the connector or an effective resistance due to water. In the case where the variation of the resistance RID corresponds to the effective resistance, when a voltage detected from the first pin is less than a reference voltage indicating a case where the first pin is in an open state (e.g., a state in which water has not entered the connector), in operation S23, it may be recognized primarily that water has entered the connector.

When water is primarily detected or recognized as described above, in operation S24, a water detection operation using a second pin (e.g., a CC pin) may be performed while disabling an RID operation and thus a certain current may be applied to the second pin. As an example, the water detection operation using the second pin may be performed a plurality of times (e.g., two times).

Then, after a certain time, in operation S25, a voltage detected from the second pin may be compared with a reference voltage (e.g., a first threshold), according to the example embodiments described above, and water may be detected based on the comparison. If the voltage detected from the second pin is less than the first threshold, in operation S28, it may be detected that there is water in the connector, and accordingly, the second pin used as a sensing pin may be turned-off (e.g. powered-off) to enter a water recognition state.

If water is not detected as the voltage detected from the second pin is greater than the first threshold, in operation S26, the current applied to the second pin may be blocked according to the example embodiments described above. Thereafter, in operation S27, a water detection operation using a second threshold may be performed after a certain time. If the voltage detected from the second pin is greater than the second threshold, it may be detected that there is water, and accordingly, a turn-off (e.g., power-off) to the second pin used as the sensing pin may be performed to enter a water recognition state. On the other hand, if water is not detected even in the detection operation using the second threshold, it may be finally detected that there is no water in the connector.

Although the flowchart of FIG. 11 describes a case where the example embodiments of the inventive concepts are applied to the water detection operation using the second pin (e.g., CC pin), the example embodiments of the inventive concepts may be applied to the water detection operation using the first pin, as described above.

Figure 12:
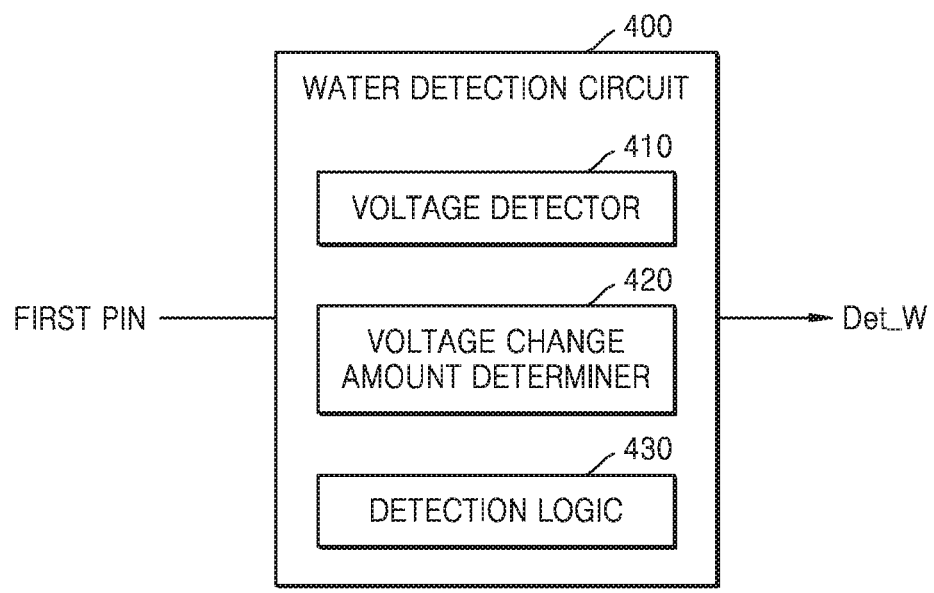
FIG. 12 is a block diagram of a water detection circuit according to another example embodiment of the inventive concepts.

FIG. 12 is a block diagram of a water detection circuit 400 according to another example embodiment of the inventive concepts.

Referring to FIG. 12, the water detection circuit 400 may include a voltage detector 410, a voltage change amount determiner 420, and detection logic 430. The water detection circuit 400 may be connected to at least one (e.g., a first pin) of a plurality of pins included in a connector (not shown) and may generate a detection result Det_W indicating that there is water in a connector, based on a voltage detected from the first pin. As an example, the voltage detector 410 may output a digital code according to a voltage level detected from the first pin, and the detection logic 430 may generate a detection result Det_W indicating that water is detected or not detected, based on the value of the digital code.

As an operation example, the voltage detector 410 may detect a first voltage level from the first pin at a first point in time and may detect a second voltage level from the first pin at a second pint in time after a certain time. The voltage change amount determiner 420 may determine an amount of change in a voltage applied to the first pin, based on a voltage difference between the first voltage level and the second voltage level. For example, a result obtained by dividing the voltage difference between the first voltage level and the second voltage level by a time interval between the first point in time and the second point in time may be determined as an amount of change in the voltage.

The water detection circuit 400 may include a circuit (not shown) capable of providing a pull-up voltage and a pull-down voltage to a node (e.g., a first node) connected to the first pin and may provide the pull-up voltage and the pull-down voltage to the first pin according to a certain period in a water detection process. In this case, pull-up and pull-down characteristics of the first pin (or the first node) may vary depending on whether water has entered or not entered the connector. For example, water that has entered the connector may have its own capacitance component, and accordingly, an amount of change in a voltage detected from the first pin may vary depending on whether there is a capacitance component due to water, in pull-up and pull-down operations.

The detection logic 430 may detect whether there is water in the connector, based on a result of comparing the amount of change in the voltage with a threshold. In the absence of water, the amount of change in the voltage may be greater than the threshold, while in the presence of water, the amount of change in the voltage may be less than the threshold. That is, according to an example embodiment, the detection logic 430 may generate a detection result Det_W, which indicates that there is water in the connector, when the amount of change in the voltage is less than the threshold.

Figure 13:
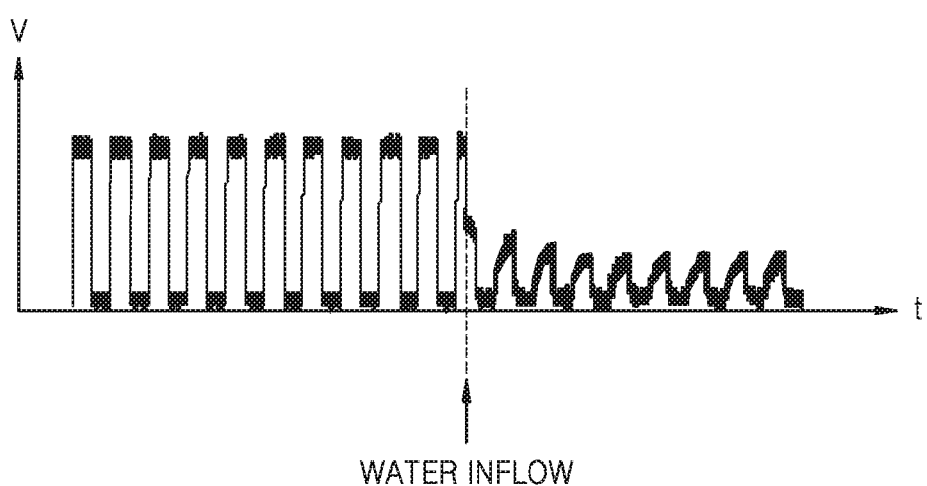
FIG. 13 is a waveform diagram illustrating an example of a change in a voltage applied to a CC1 pin or a CC2 pin of a connector.

As an example, an operation according to an example embodiment of the inventive concepts will be described below on the assumption that the first pin is a CC1 pin or a CC2 pin according to a USB type-C interface. FIG. 13 is a waveform diagram illustrating an example of a change in a voltage applied to a CC1 pin or a CC2 pin of a connector.

Referring to FIGS. 12 and 13, until an actual cable is connected to the connector, an electronic device including the water detection circuit 400 may perform three operations such as a dual role port (DRP), a download faced port (DFP), and an upload faced port (UFP), and to this end, current consumption may be sustained by repeatedly performing pull-up and pull-down operations on the CC1 and CC2 pins. In addition, a current provided in the pull-up operation may have various levels according to the capability of a current source, and as a pull-up current flows to a ground voltage according to the entry of water into the connector or a current according to a high voltage provided through a VBUS pin flows to the ground voltage, pins of the connector may corrode.

In a normal DRP operation of the electronic device including the water detection circuit 400, when there is no water, a pulse is toggled according to a pull-up or a pull-down, in accordance with a certain period (e.g., 100 ms cycle), as shown in FIG. 13. That is, when there is no water, the waveform of a voltage of the CC1 pin or the CC2 pin has rise time and fall time without charge/discharge characteristics.

On the other hand, when there is water in the connector, the waveform of the voltage of the CC1 pin or the CC2 pin may have charge/discharge characteristics due to a capacitance component caused by the water. For example, as the waveform of the voltage of the CC1 pin or the CC2 pin has charge/discharge characteristics due to a resistance component and a capacitance component, caused by water that has entered the connector, the waveform of the voltage may differ between a case where there is water in the connector and a case where there is no water in the connector. That is, in the presence of water, a variation of a voltage of the CC1 pin or the CC2 pin per unit time may be less than that in the absence of water.

Assuming that the voltage detector 410 detects a voltage at the first node connected to the CC1 pin, the voltage detector 410 may perform a voltage detection operation at least twice in a pull-up operation of the CC1 pin and provide a voltage detection result to the voltage change amount determiner 420. In addition, the voltage detector 410 may perform a voltage detection operation at least twice in a pull-down operation of the CC1 pin and provide a voltage detection result to the voltage change amount determiner 420. The voltage change amount determiner 420 may provide at least one of a result of the determination of an amount of change in the voltage in the pull-up operation of the CC1 pin and a result of the determination of an amount of change in the voltage in the pull-down operation of the CC1 pin to the detection logic 430. The detection logic 430 may determine whether a voltage change of the first node has charge/discharge characteristics due to a capacitance component of water, based on an amount of change in the voltage in the pull-up operation or the pull-down operation, and may generate a detection result Det_W based on a result of the determination.

According to the example embodiment described above, when it is determined that water has entered the connector, the electronic device including the water detection circuit 400 may perform an internal control operation for a corresponding additional process. For example, the electronic device may perform a control operation to output a warning screen, which indicates whether water has entered the connector, to a user, and/or perform a control operation to block power supply to the connector and components in the electronic device.

Figure 14:
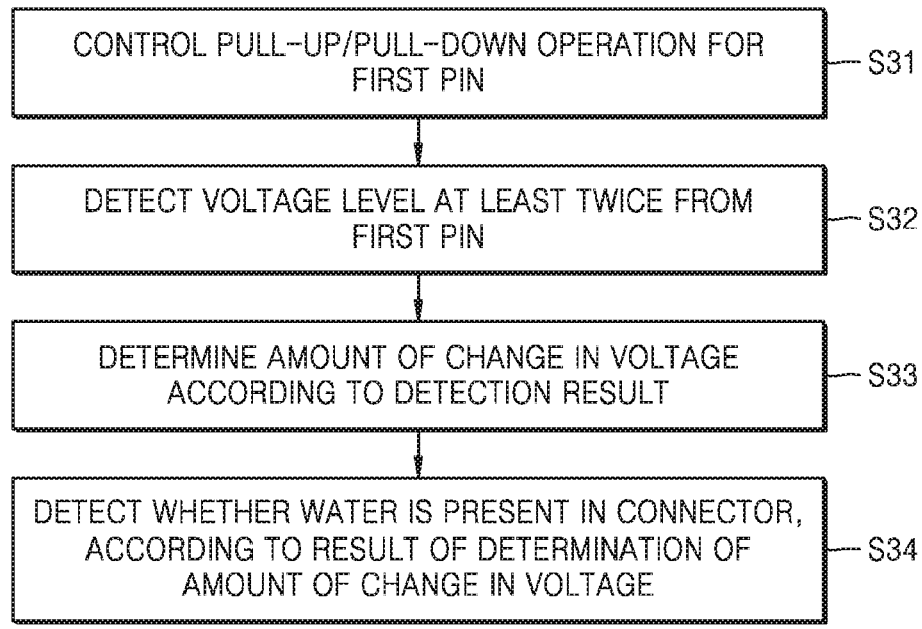
FIG. 14 is a flowchart of a water detection operation according to an example embodiment of the inventive concepts.

FIG. 14 is a flowchart of a water detection operation according to an example embodiment of the inventive concepts.

Referring to FIG. 14, an electronic device may include at least one water detection circuit, and the at least one water detection circuit may be connected to at least one (e.g., a first pin) of a plurality of pins included in a connector of the electronic device. The water detection circuit may detect a voltage level from the first pin and may control a resistance and power connection state of the first pin, adjust a current provided to the first pin, and/or block the provision of a current to the first pin.

As an example, in operation, S31, the water detection circuit may control a pull-up/pull-down operation for the first pin by providing a pull-up/pull-down voltage (or a pull-up/pull-down current) to the first pin.

In operation S32, the level of a voltage detected from the first pin may be changed according to the pull-up/pull-down operation for the first pin, and the water detection circuit may detect the voltage level at least twice from the first pin. For example, even if the same level of pull-up/pull-down voltage is provided to the first pin, the voltage level detected from the first pin may vary depending on whether there is water in the connector.

In operation S33, the water detection circuit may determine an amount of change in a voltage of the first pin according to a result obtained by detecting the voltage level. For example, when there is water in the connector, charge/discharge characteristics may be generated due to a capacitance component of the water itself, and thus, when there is water in the connector, the amount of change in the voltage of the first pin may be relatively small, compared to when there is no water in the connector.

In operation S34, the water detection circuit may detect whether there is water in the connector, based on a result of the determination of the amount of change in the voltage, and may generate a detection result.

Figure 15:
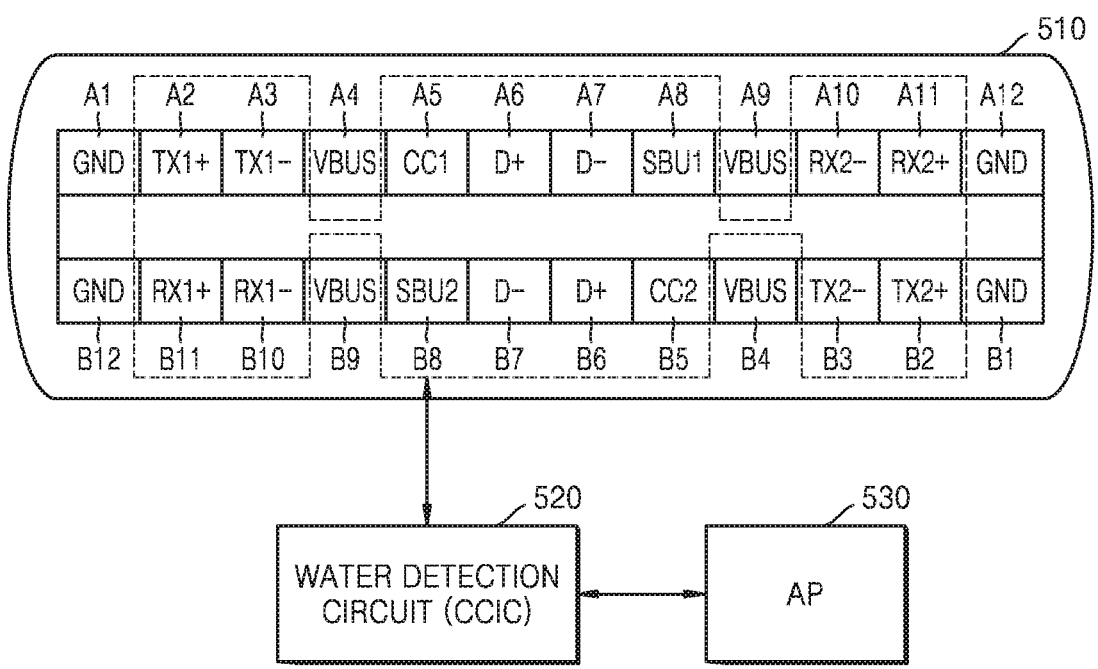
FIG. 15 is a diagram illustrating an example of detecting foreign matter by using various pins, according to an example embodiment of the inventive concepts.

FIG. 15 is a diagram illustrating an example of detecting foreign matter by using various pins, according to an example embodiment of the inventive concepts.

Referring to FIG. 15, an electronic device 500 may include a connector 510 of a USB Type-C structure, a water detection circuit 520, and an AP 530. The connector 510 may include various pins described in the above example embodiments, and VBUS pins A4, A9, B4, and B9 in the connector 510 of the USB Type-C structure may carry a power supply voltage and GND pins A1, A12, B1, and B12 in the connector 510 may carry a ground voltage.

According to an example embodiment of the inventive concepts, at least one of the remaining pins (i.e., CC1 and CC2 pins, SBU1 and SBU2 pins, TX and RX pins, D+ and D− pins, and the like) other than the VBUS pins A4, A9, B4, and B9 for carrying the power supply voltage and the GND pins A1, A12, B1, and B12 for carrying the ground voltage may be used as the first pin. Accordingly, the pull-up and pull-down operations according to the example described above may be performed on the first pin selected among the remaining pins (i.e., CC1 and CC2 pins, SBU1 and SBU2 pins, TX and RX pins, D+ and D− pins, and the like).

The water detection circuit 520 may be implemented with various types of ICs or included in an IC. As an example, the water detection circuit 520 may be included in a CCIC. The water detection circuit 520 may be switchably connected to the remaining pins (i.e., CC1 and CC2 pins, SBU1 and SBU2 pins, TX and RX pins, D+ and D− pins, and the like) and may switchably provide a pull-up current to the remaining pins (i.e., CC1 and CC2 pins, SBU1 and SBU2 pins, TX and RX pins, D+ and D− pins, and the like). If only one of the remaining pins (i.e., CC1 and CC2 pins, SBU1 and SBU2 pins, TX and RX pins, D+ and D− pins, and the like) is selected as the first pin used for water detection, a pull-up operation and a pull-down operation may be performed on the selected first pin, and a water detection operation may be performed by determining an amount of variation in a voltage of the selected first pin in pull-up and pull-down processes. If a plurality of first pins among the remaining pins (i.e., CC1 and CC2 pins, SBU1 and SBU2 pins, TX and RX pins, D+ and D− pins, and the like) are used for water detection, the plurality of first pins may be selected in a time-sharing manner and a pull-up operation and a pull-down operation may be performed on selected first pins, and a water detection operation may be performed by determining an amount of variation in a voltage of each of the selected first pins in pull-up and pull-down processes of each of the plurality of first pins. The water detection circuit 520 may finally determine whether there is water in the connector 510, based on the water detection operation performed on each of the plurality of first pins, and may determine finally whether there is water in the connector 510, based on various criteria (e.g., a case where water is detected in a reference number or greater of pins among the plurality of first pins).

Figure 16:
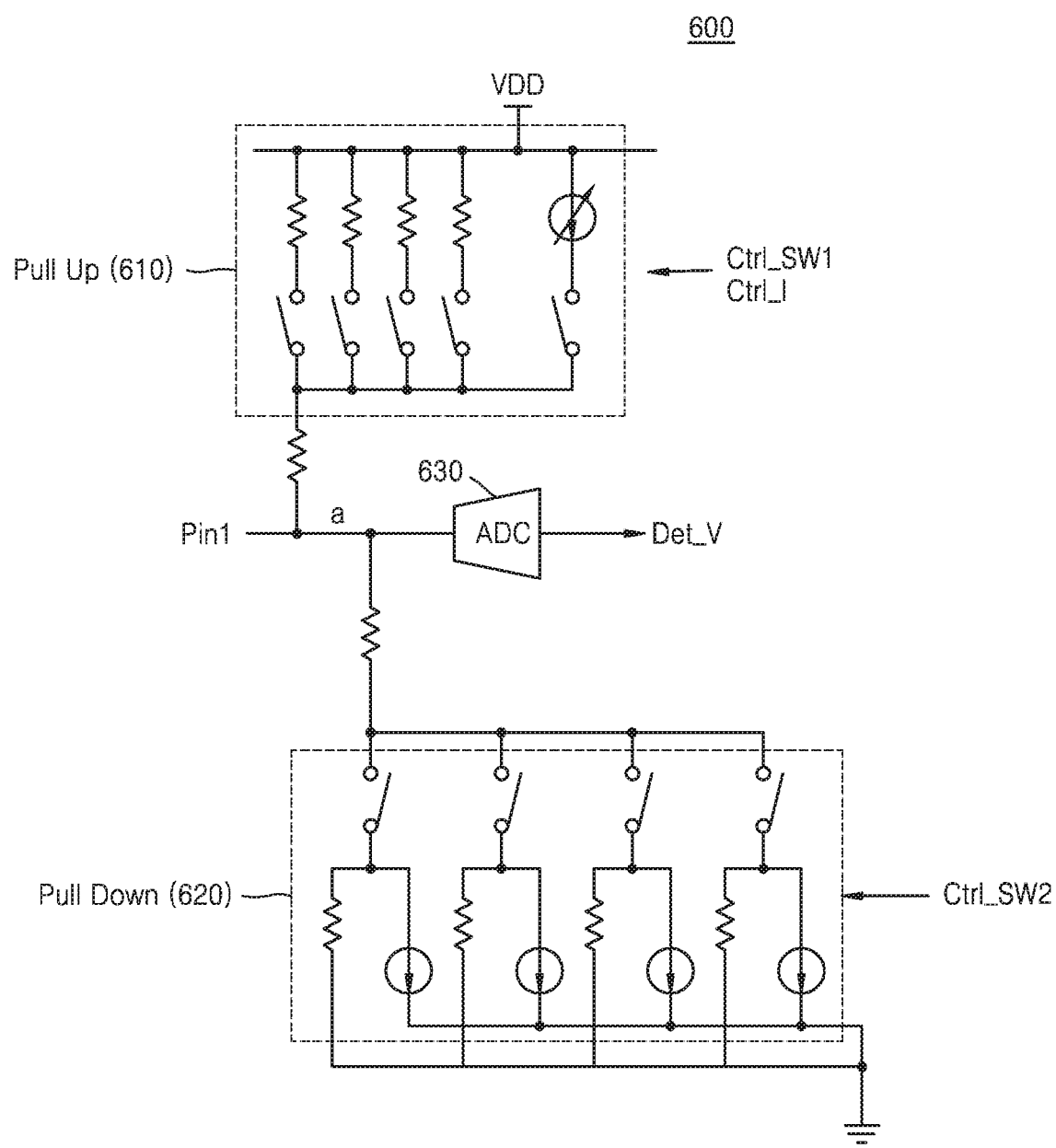
FIGS. 16 and 17 are circuit diagrams illustrating examples of a water detection circuit according to an example embodiment of the inventive concepts.
Figure 17:
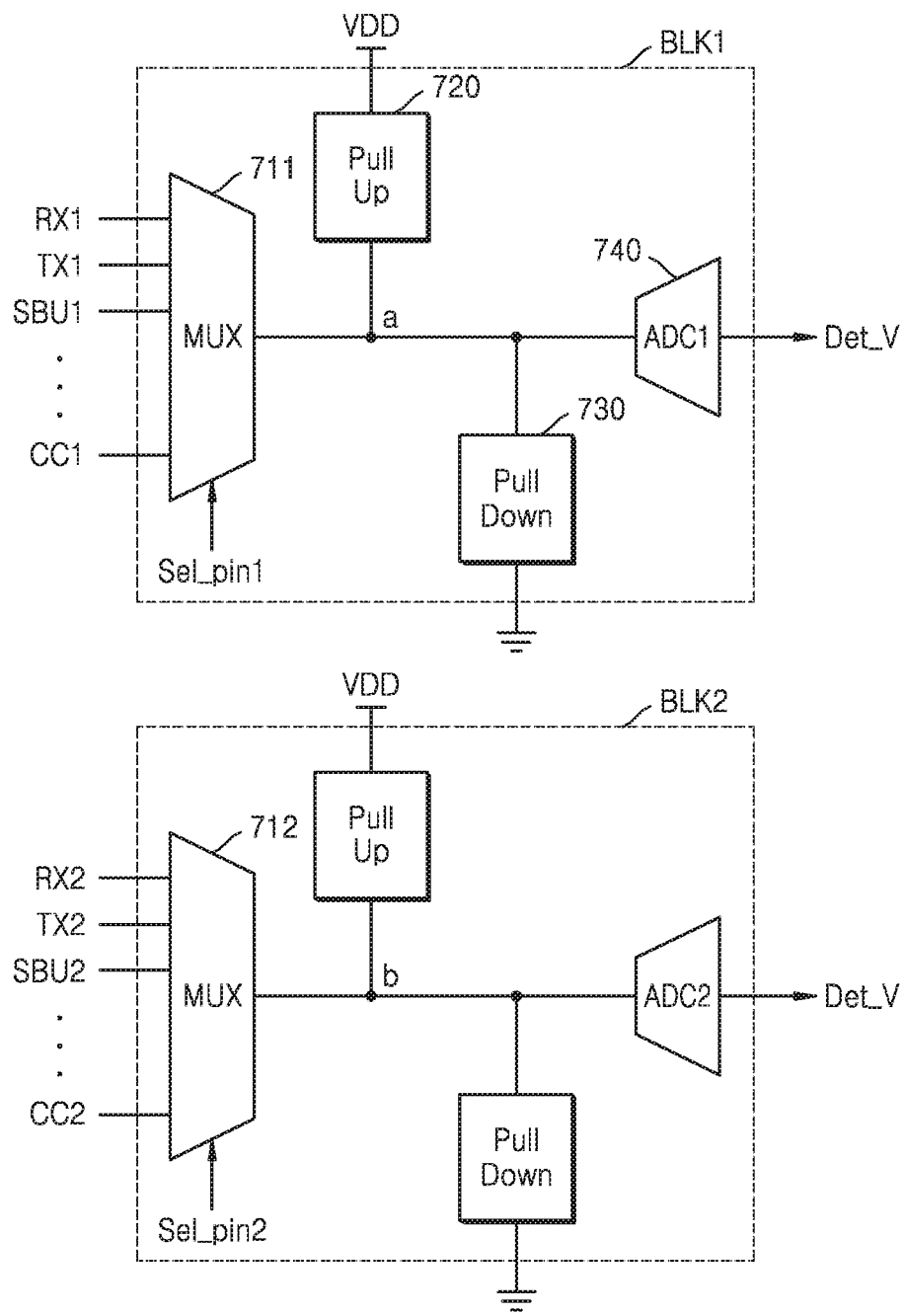

FIGS. 16 and 17 are circuit diagrams illustrating examples of a water detection circuit according to an example embodiment of the inventive concepts.

Referring to FIG. 16, a water detection circuit 600 may include a pull-up circuit 610 and a pull-down circuit 620, each connected to a first node "a" that is electrically connected to a first pin Pin 1. The first pin Pin 1 may be selected from the remaining pins other than the pins for carrying the power supply voltage or the ground voltage among the plurality of pins included in the connector of the USB Type-C structure in the example described above.

The pull-up circuit 610 may include a plurality of resistors connected in parallel to a power supply voltage VDD and a plurality of switches connected between the plurality of resistors and the first node "a." In addition, the pull-up circuit 610 may further include a current source providing a pull-up current. In an example embodiment, at least some of the plurality of resistors may have different resistances, and the value of an output current from the current source may vary based on the control of the water detection circuit 600. In an example, in response to control signals Ctrl_SW1 and Ctrl_I generated in the water detection circuit 600, the switching of the pull-up circuit 610 may be controlled or a current output operation of the current source in the pull-up circuit 610 may be controlled.

The pull-down circuit 620 may include a plurality of resistors connected in parallel to the ground voltage and a plurality of switches connected between the plurality of resistors and the first node a. In addition, the pull-down circuit 620 may further include a current source for adjusting the level of a current flowing to the ground voltage. The switches provided in the pull-down circuit 620 may be controlled in response to a control signal Ctrl_SW2 generated in the water detection circuit 600.

According to an example embodiment of the inventive concepts, the voltage detector 630 may further include an analog-to-digital converter (ADC) connected to the first node "a" and may provide a digital code as a voltage detection result Det_V based on a voltage applied to the first node "a." In addition, an amount of change in a voltage of the first node "a" may be determined using the voltage detection result Det_V having a digital code value, and based thereon, it may be detected whether there is water in the connector.

Referring to FIG. 17, a water detection circuit 700 may include configurations for detecting a voltage in parallel through at least two pins of a connector. As an example, in FIG. 17, two circuit blocks, i.e., a first circuit block BLK1 and a second circuit block BLK2, for voltage detection are illustrated. Each of the first circuit block BLK1 and the second circuit block BLK2 may include configurations for detecting a voltage through a pin. As an example, the first circuit block BLK1 may include a multiplexer 711, a pull-up circuit 720, a pull-down circuit 730, and a voltage detector 740. The first circuit block BLK1 and the second circuit block BLK2 may be connected to different pins. For example, the multiplexer 711 of the first circuit block BLK1 may be connected to pins CC1, SBU1, TX1, RX1, etc., and a multiplexer 712 of the second circuit block BLK2 may be connected to pins CC2, SBU2, TX2, RX2, etc.

The multiplexer 711 of the first circuit block BLK1 may selectively connect any one of a plurality of pins to a first node "a" based on a pin selection signal Sel_pin1 generated in the water detection circuit 700. As an example, the multiplexer 711 may connect a plurality of pins to the first node "a" in a time-sharing manner, and pull-up and pull-down operations and a voltage detection operation according to the example embodiments described above may be performed on each of the pins, connected to the first node "a," via the pull-up and pull-down circuits 720 and 730 and the voltage detector 740.

Similarly, the multiplexer 712 of the second circuit block BLK2 may selectively connect any one of a plurality of pins to a second node "b" based on a pin selection signal Sel_pin2, and the second circuit block BLK2 may generate a result Det_V by detecting a voltage from the second node "b" in the same manner as the first circuit block BLK1.

According to the example embodiment shown in FIG. 17, it is not necessary to provide a plurality of pull-up and pull-down circuits and a plurality of voltage detectors corresponding to the plurality of pins used for water detection, and the pull-up and pull-down circuits 720 and 730 and the voltage detector 740 may be shared for the plurality of pins. For example, a voltage detection operation (or a voltage change amount determination operation) for the plurality of pins may be performed in a time-sharing manner, and thus, a plurality of determination results using the plurality of pins may be generated. In addition, a plurality of circuit blocks, each of which detects a voltage from any one of the pins, may be provided, and accordingly, voltages may be detected in parallel from at least two pins and thus a voltage detection speed for water detection may be improved. A detection logic (not shown) in the example embodiment described above may detect the presence or absence of water in a connector by using determination results using the plurality of pins.

Figure 18A:
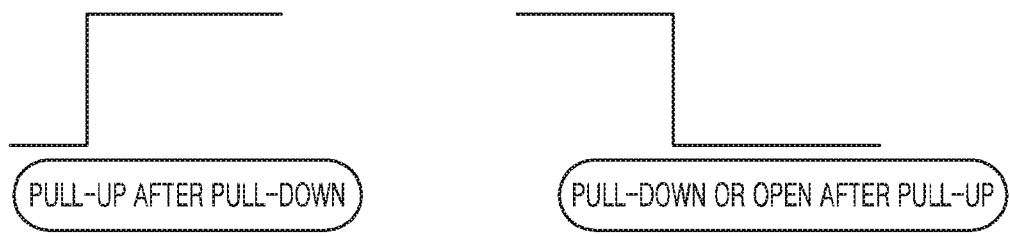
FIGS. 18A to 18C are waveform diagrams illustrating waveforms of a voltage applied to a first pin, according to an example embodiment of the inventive concepts.
Figure 18B:
Figure 18C:
Figure 19A:
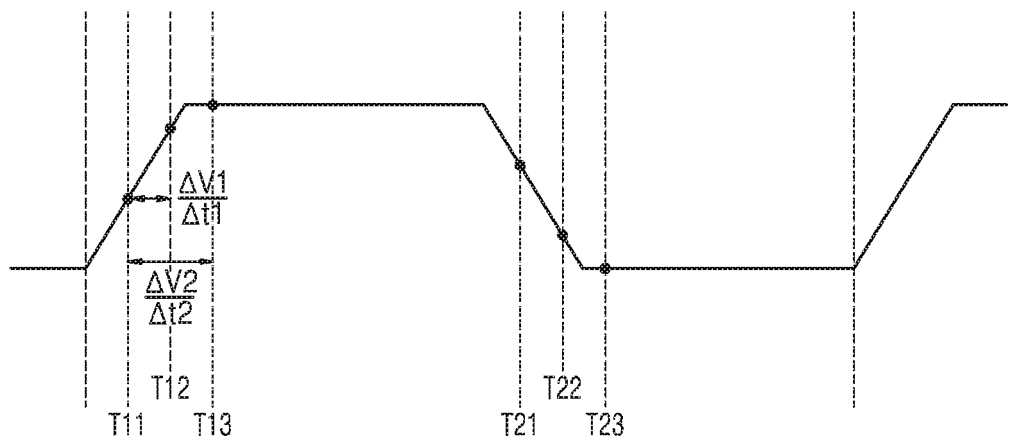
FIGS. 19A and 19B are waveform diagrams illustrating voltage detection timing applied to the first pin, according to an example embodiment of the inventive concepts.
Figure 19B:
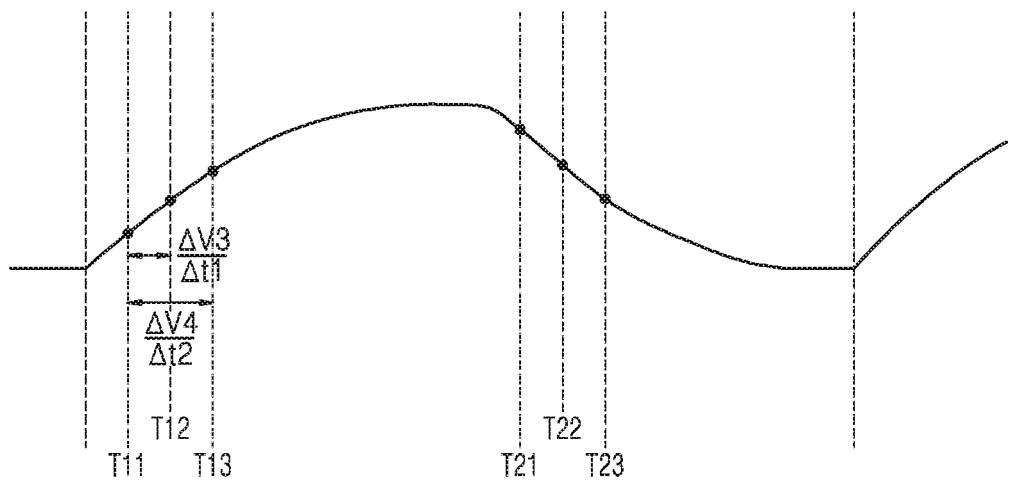

FIGS. 18A to 18C are waveform diagrams illustrating waveforms of a voltage applied to a first pin, according to an example embodiment of the inventive concept, and FIGS. 19A and 19B are waveform diagrams illustrating voltage detection timing applied to the first pin, according to an example embodiment of the inventive concept FIG. 18A illustrates an example in which a voltage applied to the first pin is changed from a logic low to a logic high as a pull-up operation for the first pin is performed and the voltage applied to the first pin is changed from a logic high to a logic low as a pull-down operation for the first pin is performed. FIG. 18B illustrates a case where a voltage level detected from the first pin does not have charge/discharge characteristics as there is no water in a connector, and FIG. 18C illustrates a case where the voltage level detected from the first pin has charge/discharge characteristics as there is water in the connector.

Referring to FIGS. 18B and 18C, there is a section in which amounts of variation in a voltage of the first pin are different from each other depending on the presence or absence of water in each of the pull-up operation and pull-down operation for the first pin, and the amounts of variation in the voltage may be determined by detecting a voltage level from the first pin at two or more points in time of the section in which the amounts of variation in the voltage are different from each other.

FIG. 19A illustrates a case where there is no water in the connector as in FIG. 18B, and FIG. 19B illustrates a case where there is water in a connector as in FIG. 18C. In FIGS. 19A and 19B, an example in which at least three voltage detection operations are performed in each of the pull-up operation and the pull-down operation is illustrated.

As an example, first to third time points T11 to T13 may be defined in the pull-up operation. When there is no water in the connector, the first and second time points T11 and T12 may correspond to points in time at which a voltage detected from the first pin does not reach a logic high level, and the third time point T13 may correspond to a point in time at which a voltage detected from the first pin reaches a logic high level. On the other hand, when there is water in the connector, a voltage detected from the first pin at each of the first to third time points T11 to T13 may not reach a logic high level. Similarly, fourth to sixth time points T21 to T23 may be defined in the pull-down operation. When there is no water in the connector, the fourth and fifth time points T21 and T22 may correspond to points in time at which a voltage detected from the first pin does not reach a logic low level, and the sixth time point T23 may correspond to a point in time at which a voltage detected from the first pin reaches a logic low level. However, according to an example embodiment of the inventive concept, points in time at which a voltage level as described above is detected may be defined as various points in time at which an amount of variation in the voltage varies depending on whether there is water in the connector or not.

The amount of variation in the voltage may be calculated by a difference value of the level of the voltage per unit time, and variation amounts $\Delta V1/\Delta t1$ and $\Delta V2/\Delta t2$ of the voltage determined when there is no water in the connector may be different from variation amounts $\Delta V3/\Delta t1$ and $\Delta V4/\Delta t2$ of the voltage determined when there is water in the connector. In addition, a threshold may be appropriately set so as to determine whether there is water in the connector or not. That is, since the variation amount of the voltage may be determined differently depending on a point in time at which the voltage level is detected, the threshold set for water detection may be set in consideration of a point in time at which the voltage level is detected.

While example embodiments of the inventive concepts have been particularly shown and described with reference to some example embodiments thereof, it will be understood that various changes in form and details may be made therein without departing from the spirit and scope of the following claims.

What is claimed is:

1. A water detection circuit comprising:
   a voltage detector electrically connected to at least one first pin of a connector including a plurality of pins, the voltage detector configured to detect a first voltage level from the at least one first pin at a first point in time and a second voltage level from the at least one first pin at a second point in time; and
   control circuitry configured to,
      compare the first voltage level with a first threshold to perform a first water detection operation,
      block a current from being supplied to the at least one first pin before the second point in time, after the first water detection operation is completed,
      compare the second voltage level with a second threshold to perform a second water detection operation, and
      determine whether water is present in the connector based on the first water detection operation and the second water detection operation.

2. The water detection circuit of claim 1, wherein
   the connector conforms to a Universal Serial Bus (USB) type-C interface, and
   the first pin is one of a configuration channel 1 (CC1) pin and a configuration channel 2 (CC2) pin defined in the USB type-C interface.

3. The water detection circuit of claim 2, wherein the water detection circuit comprises:
a configuration channel integrated circuit (CCIC) for performing data connection and control via at least one of the CC1 pin and the CC2 pin in a normal mode, and performing the first water detection operation and the second water detection operation in a water detection mode.

4. The water detection circuit of claim 1, wherein
the first voltage level includes a first voltage component associated with the current applied to the first pin and resistance of the water, and a second voltage component associated with a capacitance component of the water, and
the voltage detector is configured to detect the second voltage level in a state where the first voltage component is removed from the first pin while the current applied to the first pin is blocked.

5. The water detection circuit of claim 1, wherein
the first threshold is greater than the second threshold, and the control circuitry is configured to
detect, in the first water detection operation, that the water is present in the connector in response to the first voltage level being lower than the first threshold, and
detect, in the second water detection operation, that the water is present in the connector in response to the second voltage level being higher than the second threshold.

6. The water detection circuit of claim 1, further comprising:
a current source configured to apply the current to the first pin, wherein
the control circuitry is further configured to control the current source such that the current is supplied to the first pin in the first water detection operation and application of the current to the first pin is blocked when water is not detected in the first water detection operation.

7. The water detection circuit of claim 1, wherein the second point in time is a certain set time after the control circuitry blocks application of the current to the first pin.

8. The water detection circuit of claim 1, wherein the control circuitry is configured to selectively perform the second water detection operation in response to not detecting water in the first water detection operation.

9. A water detection circuit comprising:
a voltage detector electrically connected to at least one first pin of a connector including a plurality of pins, the voltage detector configured to detect a first voltage level from the at least one first pin at a first point in time and a second voltage level from the at least one first pin at a second point in time; and
control circuitry configured to,
determine an amount of change in a voltage detected from the first pin, based on the first voltage level detected at the first point in time and the second voltage level detected at the second point in time,
determine charge or discharge characteristics of the voltage based on the amount of change in the voltage, and
detect whether water is present in the connector based on the charge or discharge characteristics and a threshold.

10. The water detection circuit of claim 9, wherein, when water is present in the connector, the charge or discharge characteristics vary due to a capacitance component of water that has entered the connector.

11. The water detection circuit of claim 9, wherein
the plurality of pins of the connector conform to a Universal Serial Bus (USB) type-C interface, the plurality of pins including power supply pins and non-power supply pins, the power supply pins each associated with carrying one of a power supply voltage and a ground voltage, and
the first pin includes at least one of the non-power supply pins.

12. The water detection circuit of claim 11, wherein the first pin includes one of a configuration channel 1 (CC1) pin and a configuration channel 2 (CC2) pin defined in the USB type-C interface.

13. The water detection circuit of claim 12, wherein the water detection circuit comprises:
a configuration channel integrated circuit (CCIC) configured to,
perform, in a normal mode, data connection and control via at least one of the CC1 pin and the CC2 pin, and
perform, in a water detection mode, a water detection operation based on the amount of change in the voltage.

14. The water detection circuit of claim 9, further comprising:
a pull-up circuit configured to pull up a first node connected to the first pin; and
a pull-down circuit configured to pull down the first node, wherein
the voltage detector is connected to the first node such that the voltage detector is configured to detect the first voltage level and the second voltage level in a pull-up operation or a pull-down operation for the first node.

15. The water detection circuit of claim 14, further comprising:
a multiplexer configured to sequentially connect at least two pins of the plurality of pins to the first node, wherein
the voltage detector is connected to the first node such that the voltage detector configured to detect the first voltage level and the second voltage level sequentially from each of the at least two pins.

16. An electronic device comprising:
a connector configured to connect to an external cable, the connector including a plurality of pins;
a water detection circuit electrically connected to at least one first pin of the plurality of pins, the water detection circuit configured to detect whether water is present in the connector by,
performing a first water detection operation based on a first voltage level and a first threshold, the first voltage level being detected from the at least one first pin at a first point in time, and
performing a second water detection operation based on a second voltage level and a second threshold, the second voltage level being detected from the at least one first pin at a second point in time; and
an application processor configured to control an operation of the electronic device for a subsequent process in response to the water detection circuit detecting the water being present in the connector.

17. The electronic device of claim 16, wherein
the first pin is configured to connect to a ground voltage through a resistance component of water, when the water is present in the connector, the first voltage level and the second voltage level are based on potential energy of a capacitance component of the water and the resistance component of the water.

18. The electronic device of claim 16, wherein the water detection circuit is configured to,
   detect, during the first water detection operation, that no water is present in the connector in response to the first voltage level being higher than the first threshold, and
   in response to detecting, during the first water detection operation, that no water is present in the connector,
      block application of current to the first pin, and
      selectively perform the second water detection operation in a state where the application of the current to the first pin is blocked.

19. The electronic device of claim 18, wherein the second threshold is less than the first threshold, and the water detection circuit is configured to detect that water is present in the connector in response to the second voltage level being greater than the second threshold in the second water detection operation.

20. The electronic device of claim 16, wherein the connector is configured to communicate with the external cable according to a Universal Serial Bus (USB) type-C interface.

* * * * *